US010647325B2

(12) United States Patent
Hirai et al.

(10) Patent No.: US 10,647,325 B2
(45) Date of Patent: May 12, 2020

(54) ROUTE DETERMINATION DEVICE, ROUTE DETERMINATION METHOD, AND RECORDING MEDIUM RECORDING PROGRAM

(71) Applicant: Panasonic Intellectual Property Management Co., Ltd., Osaka (JP)

(72) Inventors: Yoshito Hirai, Kanagawa (JP); Hirofumi Nishimura, Kanagawa (JP); Naoya Yosoku, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 380 days.

(21) Appl. No.: 15/428,297

(22) Filed: Feb. 9, 2017

(65) Prior Publication Data

US 2017/0240180 A1    Aug. 24, 2017

(30) Foreign Application Priority Data

Feb. 24, 2016   (JP) .................. 2016-033420

(51) Int. Cl.
*B60W 40/06* (2012.01)
*G05D 1/02* (2020.01)
(Continued)

(52) U.S. Cl.
CPC ......... *B60W 40/06* (2013.01); *G01C 21/3602* (2013.01); *G01S 13/42* (2013.01);
(Continued)

(58) Field of Classification Search
CPC .............. B60W 40/06; G06K 9/00791; G06K 2009/00738; G05D 1/0259; G05D 1/024;
(Continued)

(56) References Cited

U.S. PATENT DOCUMENTS 7,376,262 B2 * 5/2008 Hu ....................... G06K 9/3216
382/103
7,460,951 B2 * 12/2008 Altan ..................... G01S 13/726
340/903

(Continued)

FOREIGN PATENT DOCUMENTS

JP   2010-198198   9/2010
JP   2014-106147   6/2014

OTHER PUBLICATIONS

EPO Machine Translation Description JP2014106147, Jun. 9, 2014 (Year: 2014).*

(Continued)

*Primary Examiner* — Jelani A Smith
*Assistant Examiner* — Majdi Alsomiri
(74) *Attorney, Agent, or Firm* — Greenblum & Bernstein, P.L.C.

(57) ABSTRACT

A determination device includes: route detection circuitry which detects, a first continuous body as a first part of a one or more first direction distance information with respect to a first object, and a second continuous body as a second part of the one or more first direction distance information with respect to a second object, in a first direction along a first route on which the moving body moves, and a third continuous body as the second part, in a second direction; route determination circuitry which determines presence or absence of a second route along the third continuous body.

10 Claims, 15 Drawing Sheets

(51) Int. Cl.
*G01S 13/42* (2006.01)
*G05D 1/00* (2006.01)
*G01C 21/36* (2006.01)
*G06K 9/00* (2006.01)
*G08G 1/16* (2006.01)

(52) U.S. Cl.
CPC .......... G05D 1/0088 (2013.01); G05D 1/024 (2013.01); G05D 1/0259 (2013.01); G06K 9/00791 (2013.01); *G06K 2009/00738* (2013.01); *G08G 1/165* (2013.01); *G08G 1/166* (2013.01); *G08G 1/167* (2013.01)

(58) Field of Classification Search
CPC .. G05D 1/0088; G01S 13/42; G01C 21/3602; G08G 1/167; G08G 1/166; G08G 1/165
See application file for complete search history.

(56) References Cited

U.S. PATENT DOCUMENTS

| | | | | |
|---|---|---|---|---|
| 8,830,044 B2* | 9/2014 | Fukamachi | ............. | G08G 1/16 340/425.5 |
| 9,139,201 B2* | 9/2015 | Nagata | ............. | B60T 7/22 |
| 9,555,803 B2* | 1/2017 | Pawlicki | ............. | B60W 30/18 |
| 10,083,605 B2* | 9/2018 | Sendhoff | ............. | G08G 1/0967 |
| 2004/0080405 A1* | 4/2004 | Hijikata | ............. | B60W 50/16 340/435 |
| 2006/0116807 A1* | 6/2006 | Hijikata | ............. | B60W 50/16 701/96 |
| 2006/0145827 A1* | 7/2006 | Kuge | ............. | B60K 31/0008 340/439 |
| 2007/0063875 A1* | 3/2007 | Hoffberg | ............. | G08G 1/0104 340/995.1 |
| 2007/0225913 A1* | 9/2007 | Ikeda | ............. | G06K 9/00798 382/104 |
| 2007/0276577 A1* | 11/2007 | Kuge | ............. | B60W 10/06 701/96 |
| 2008/0013790 A1* | 1/2008 | Ihara | ............. | B60W 40/109 382/104 |
| 2008/0027627 A1* | 1/2008 | Ikeda | ............. | G06K 9/00798 701/117 |
| 2008/0300733 A1 | 12/2008 | Rasshofer et al. | | |
| 2009/0268946 A1* | 10/2009 | Zhang | ............. | G06K 9/00791 382/104 |
| 2010/0017060 A1* | 1/2010 | Zhang | ............. | G01S 7/4802 701/41 |
| 2010/0098290 A1* | 4/2010 | Zhang | ............. | B60W 30/00 382/100 |
| 2010/0098297 A1* | 4/2010 | Zhang | ............. | B60W 30/09 382/104 |
| 2010/0100321 A1* | 4/2010 | Koenig | ............. | G01C 21/005 701/472 |
| 2010/0104137 A1* | 4/2010 | Zhang | ............. | G06K 9/00798 382/104 |
| 2010/0104199 A1* | 4/2010 | Zhang | ............. | G06K 9/00798 382/199 |
| 2010/0106356 A1* | 4/2010 | Trepagnier | ............. | G01S 17/023 701/25 |
| 2010/0253541 A1* | 10/2010 | Seder | ............. | G01S 13/723 340/905 |
| 2010/0253542 A1* | 10/2010 | Seder | ............. | G01S 7/22 340/932.2 |
| 2010/0253543 A1* | 10/2010 | Szczerba | ............. | B60Q 9/005 340/932.2 |
| 2010/0253594 A1* | 10/2010 | Szczerba | ............. | G01S 13/723 345/7 |
| 2011/0205042 A1* | 8/2011 | Takemura | ............. | G08G 1/166 340/435 |
| 2012/0026012 A1* | 2/2012 | Yamashita | ............. | B60R 1/00 340/904 |
| 2012/0050074 A1* | 3/2012 | Bechtel | ............. | B60R 1/04 340/988 |
| 2012/0050138 A1* | 3/2012 | Sato | ............. | B60K 35/00 345/4 |
| 2012/0206597 A1* | 8/2012 | Komoto | ............. | G06K 9/00805 348/135 |
| 2012/0213405 A1* | 8/2012 | Sasaki | ............. | G06K 9/00791 382/103 |
| 2012/0314055 A1* | 12/2012 | Kataoka | ............. | G08G 1/167 348/117 |
| 2013/0033368 A1 | 2/2013 | Fukamachi | | |
| 2013/0223689 A1* | 8/2013 | Saito | ............. | G06K 9/00791 382/104 |
| 2015/0070158 A1* | 3/2015 | Hayasaka | ............. | G01S 7/04 340/438 |
| 2015/0243171 A1* | 8/2015 | Emura | ............. | G06T 11/60 340/435 |
| 2015/0324651 A1* | 11/2015 | Fukata | ............. | G06K 9/00825 348/148 |
| 2016/0042645 A1* | 2/2016 | Harada | ............. | G01S 13/867 701/117 |
| 2016/0321920 A1* | 11/2016 | Hayasaka | ............. | G08G 1/166 |
| 2017/0039433 A1* | 2/2017 | Kawano | ............. | G06K 9/00791 |
| 2017/0168494 A1* | 6/2017 | Sibenac | ............. | B60W 30/08 |

OTHER PUBLICATIONS

The Extended European Search Report from the European Patent Office (EPO) dated Aug. 7, 2017 for the related European Patent Application No. 17156159.0.
Communication pursuant to Article 94(3) EPC from the European Patent Office (EPO) dated Jul. 6, 2018 for the related European Patent Application No. 17156159.0.
Hata Alberto Y et al: "Road Geometry Classification using ANN", 2014 IEEE Intelligent Vehicles Symposium Proceedings, IEEE, Jun. 8, 2014 (Jun. 8, 2014), pp. 1319-1324, XP032620268.
Yiming Nie et al: "Camera and Lidar Fusion for Road Intersection Detection", Electrical&Electronics Engineering (EEESYM), 2012 IEEE Symposium on, IEEE, Jun. 24, 2012 (Jun. 24, 2012), pp. 273-276, XP032217494.

* cited by examiner

ROUTE DETERMINATION DEVICE, ROUTE DETERMINATION METHOD, AND RECORDING MEDIUM RECORDING PROGRAM

BACKGROUND

1. Technical Field

The present disclosure relates to a determination device communicable with a direction distance sensor, a determination method, and a recording medium recording a program.

2. Description of the Related Art

Information about an intersection through which own transport machine is to pass next has been conventionally provided to an operator of the transport machine by various methods.

For example, in the intersection detection method disclosed in Japanese Unexamined Patent Application Publication No. 2014-106147, in-vehicle data including first data to be used in the case of examining a state around a moving body and first position information indicating a position of the moving body and map data including second position information indicating the position of an intersection are first acquired. Subsequently, the in-vehicle data acquired at a spot within a predetermined distance from the intersection is selected on the basis of the first position information and the second position information and whether or not the characteristics of the intersection exist in the first data of the selected in-vehicle data is determined. After the in-vehicle data acquired within the intersection is specified on the basis of this determination result, the start position of a search range is determined on the basis of this specified in-vehicle data. Further, after the search direction of the in-vehicle data is determined as a time direction which is reverse to the recording time direction of the in-vehicle data, the in-vehicle data to be determined is successively selected in accordance with the search direction and whether or not characteristics corresponding to an intersection start position appear in the in-vehicle data to be determined is determined. Consequently, the in-vehicle data of the intersection start position is specified.

Further, the warning device for vehicle disclosed in Japanese Patent No. 5338371 includes an acquisition unit which acquires information on a state of a vehicle and information on a state around the vehicle, a determination unit which determines whether or not a warning which promotes deceleration or stop is required to be outputted based on acquired information of the acquisition unit, a warning unit which outputs a warning based on a determination result of the determination unit, and a detection unit which detects a sign which promotes deceleration or stop and is placed in a vehicle traveling direction. Here, in the case where a sign is detected by the detection unit, the warning unit does not output a warning or the warning unit does not output a warning until a predetermined condition is satisfied.

SUMMARY

It is sometimes difficult to see a road connecting to an intersection or a road existing beyond a bending point, in traveling of a vehicle in a road network. Accordingly, more detailed information on such intersection or a bending point (referred to below as a specific region) is required to be provided.

One non-limiting and exemplary embodiment facilitates providing a determination device, a determination method, and a recording medium recording a program, by which detailed information on a specific region with poor visibility can be provided.

In one general aspect, the techniques disclosed here feature a determination device including: an input terminal which receives one or more first direction distance information representing a direction and a distance to one or more objects existing in a first range, from a first sensor mounted on a moving body; route detection circuitry which detects, a first continuous body as a first part of the one or more first direction distance information with respect to a first object among the one or more objects, and a second continuous body as a second part of the one or more first direction distance information with respect to a second object which is located farther from the moving body than the first object, among the one or more objects, in a first direction along a first route on which the moving body moves, and a third continuous body as the second part of the one or more first direction distance information, in a second direction different from the first direction; route determination circuitry which determines presence or absence of a second route along the third continuous body in a case where a length of the third continuous body is equal to or more than a first value; and an output terminal which outputs the determination result to a moving body control device, the determination result causing the moving body control device to control the movement of the moving body.

According to the above aspect, it is possible to provide a determination device, a determination method, and a recording medium recording a program, by which detailed information on a specific region with poor visibility can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

1. Embodiment

Figure 1:
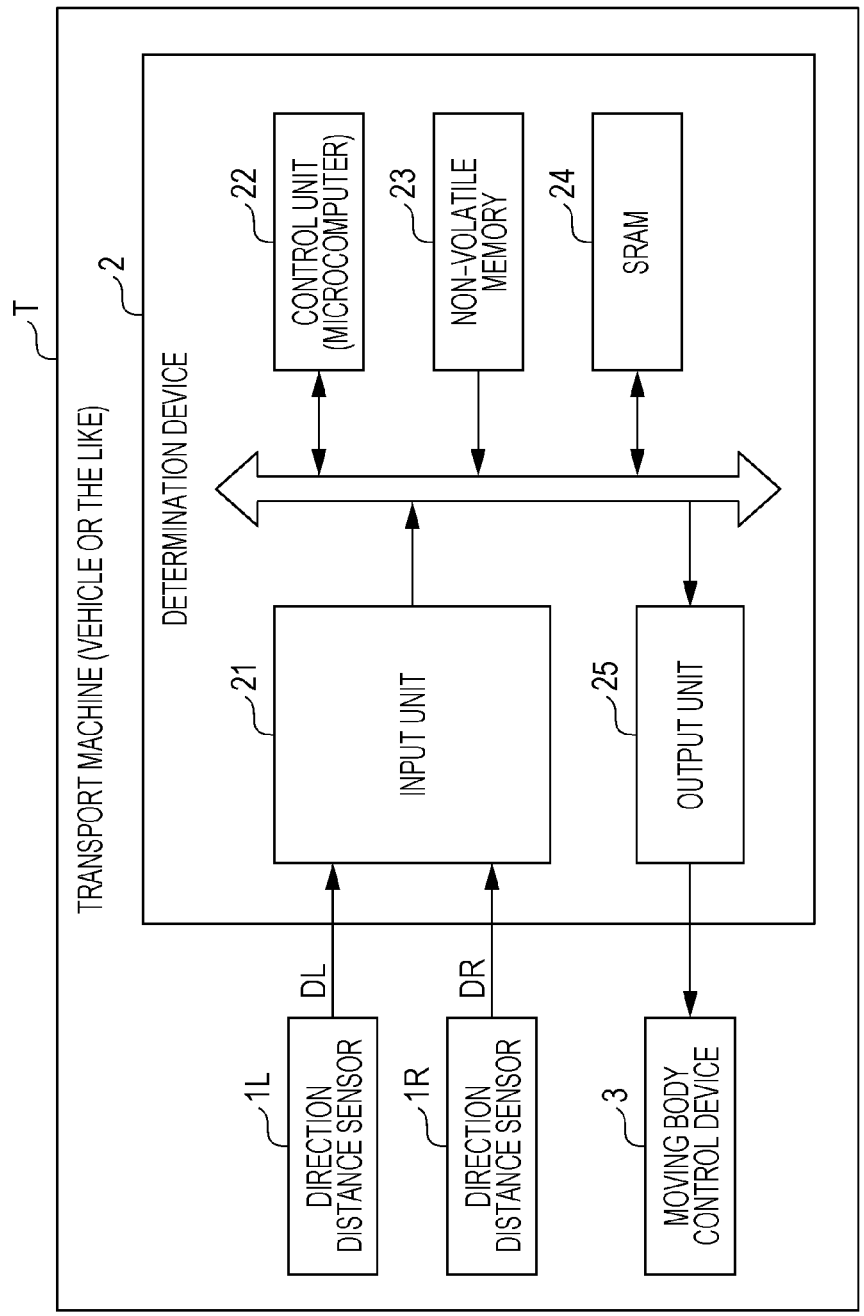
FIG. 1 illustrates an example of the hardware configuration of a determination device according to the present disclosure.

A determination device, a determination method, a program, and a recording medium recording a program according to the present disclosure will be detailed below with reference to the above-mentioned drawings.

<<1-1. Definition>>

In the drawings, it is assumed that the x axis and the y axis respectively represent the width direction and the length direction of a transport machine T and the origin P0 of the both axes represents an attachment position of a direction distance sensor 1R with respect to the transport machine T on a current position. Further, in the present embodiment, an advancing direction of the transport machine T has positive values on the y axis and the right side of the advancing direction has positive values on the x axis.

Further, the transport machine T is an example of a moving body and is typically a vehicle. Further, a specific region C is an intersection or a bending point in a route network (typically, a road network) in which the transport machine T can travel. Further, a right T-junction (T-junction having right exit and straight exit) or a left T-junction (T-junction having left exit and straight exit) is a trifurcate road in which a second route R2 connects to a first route R1, on which the transport machine T travels, from the right side or the left side. A lower T-junction (T-junction having left exit and right exit) is a trifurcate road in which the second routes R2 connect to the first route R1, on which the transport machine T travels, from both of the right side and the left side. Further, a right L-junction (right corner) and a left L-junction (left corner) are routes which are bent by approximately 90° to the right direction and the left direction respectively with respect to the advancing direction of the transport machine T.

<<1-2. Configuration of Determination Device and Peripheral Configurations>>

FIG. 1 illustrates an example of the hardware configuration of a determination device. FIG. 1 exemplifies a vehicle as the transport machine T. On the transport machine T, the direction distance sensor 1R, a direction distance sensor 1L, and a determination device 2 are mounted.

The direction distance sensor 1R is a laser radar or a millimeter wave radar, for example, and is attached on the right front of the transport machine T. The direction distance sensor 1R scans within a measurable range thereof (in other words, within a measurable range on the right front direction of the transport machine T) by predetermined angular steps so as to emit a ranging wave for measuring a distance between an object and the direction distance sensor 1R to a direction which is defined for every predetermined angular step, for example. The direction distance sensor 1R receives a reflection wave with respect to the emitted wave (ranging wave) and derives a spatial distance to an object existing in each direction (not only a moving body but also a wall, a tree, a sign, and so on) based on the time of flight (TOF) system, for example, so as to generate direction distance information DR, which is a combination of a spatial distance and a direction corresponding to an object, for one frame. A boundary between a road surface of a route on which the transport machine T travels and other part can be defined by the direction distance information DR of unit frame and the direction distance information DR is generated for every frame cycle.

The determination device 2 is housed in a casing of an electronic control unit (ECU), for example, and includes an input unit 21, a control unit 22, a non-volatile memory 23, an SRAM 24, and an output unit 25.

The input unit 21 receives the direction distance information DR from the direction distance sensor 1R. Further, the input unit 21 forwards the received direction distance information DR to the SRAM 24 under the control of the control unit 22. The output unit 25 outputs information generated by the control unit 22 which will be described later to a moving body control device 3 (for example, a display device or an automatic travel control device) which is mounted on the transport machine T.

<<1-3. Functional Blocks of Control Unit>>

Figure 2:
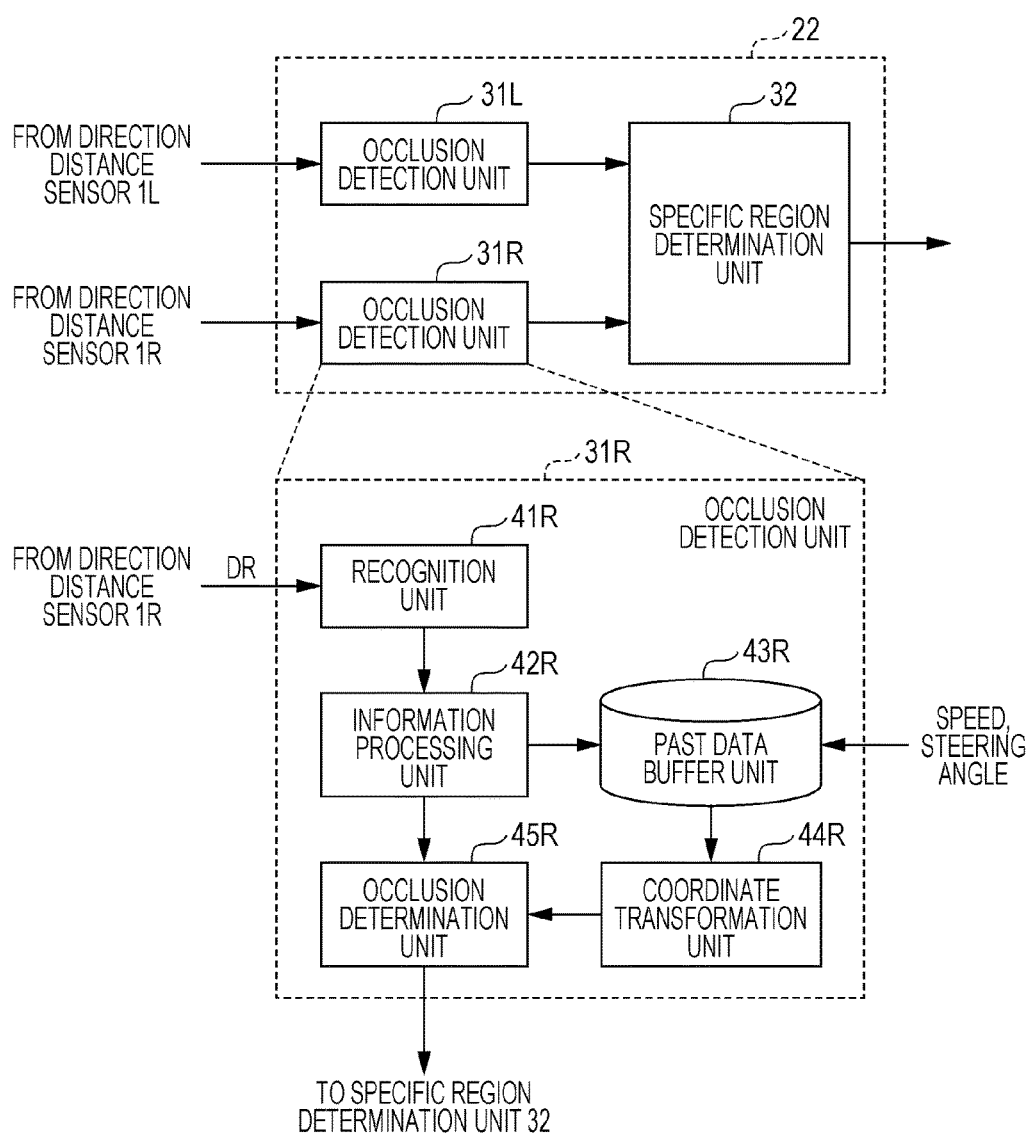
FIG. 2 illustrates an example of functional blocks of a control unit of FIG. 1 and an example of an occlusion detection unit.

The control unit 22 is a microcomputer, for example, and executes a program which is preliminarily stored in the non-volatile memory 23 by using the SRAM 24 as an operating region so as to function as an occlusion detection unit 31R, an occlusion detection unit 31L, and a specific region determination unit 32 as illustrated in FIG. 2.

Further, the occlusion detection unit 31R includes a recognition unit 41R, an information processing unit 42R, a past data buffer unit 43R, a coordinate transformation unit 44R, and an occlusion determination unit 45R as functional blocks.

Figure 3:
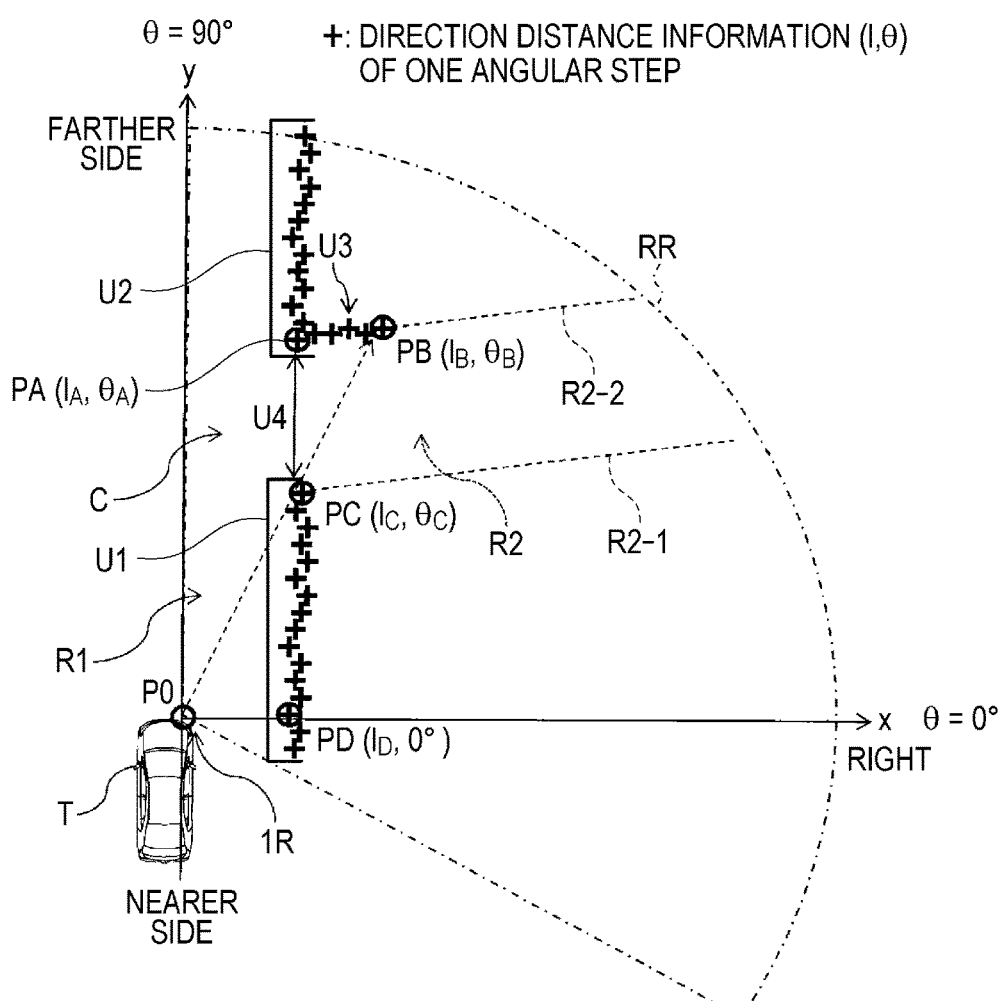
FIG. 3 illustrates an example of a relationship among direction distance information, a first continuous body, a break zone, and a second continuous body.

The recognition unit 41R selects direction distance information DR satisfying a predetermined condition from a plurality of direction distance information DR which are obtained in a frame unit. The direction distance information DR satisfying a predetermined condition will be described below with reference to FIG. 3. In FIG. 3, a region surrounded by a dashed-dotted sector is an example of a measurable range RR. Further, in the drawings, the direction distance information DR for every angular step is denoted by a "+" mark. Here, in the example of FIG. 3, it is illustratively defined that the x-axis direction is a direction of 0° ($\theta=0°$) and the y-axis direction is a direction of 90° ($\theta=90°$).

FIG. 3 illustrates direction distance information DR, which are obtained on the nearer side of (a negative direction side of the y axis) a specific region C (for example, an intersection) on the first route R1, for all angular steps. To this specific region C, a narrow street (referred to below as a second route) R2 connects from the diagonally forward right, for example, on the basis of the transport machine T.

For example, in the case where the visibility of the second route R2 from the direction distance sensor 1R is not satisfactory due to a first continuous body U1 which is a first object along the first route R1, the acquisition amount of the direction distance information DR on a first boundary R2-1 of the second route R2 (that is, a part on the negative direction side of the y axis) is small. Further, the acquisition amount of the direction distance information DR on a second boundary R2-2 of the second route R2 (that is, a part on the positive direction side of the y axis) is small in a region blocked by the first continuous body U1 of the first route R1.

A first position PA, a second position PB, and a third position PC in the xy coordinate system in the present embodiment are defined here. The first position PA is an intersection point between a second continuous body U2 which is a second object along the first route R1 and the second boundary R2-2 of the second route R2. The third position PC is an intersection point between the first continuous body U1 which is the first object along the first route R1 and the first boundary R2-1 of the second route R2.

Here, between the first continuous body U1 and the second continuous body U2, there is a break zone U4 of the direction distance information DR between the first position PA and the third position PC. The break zone U4 has the width in a direction along the first route R1 in the specific region C.

The second position PB is positioned apart from the second continuous body U2 and positioned on a third continuous body U3 along the second boundary R2-2 of the second route R2. Further, the second position PB is a right end point which can be seen from a current position P0 of the transport machine T. The direction distance sensor 1R selects and outputs at least a plurality of direction distance information DR which are mostly distributed between the first position PA and the second position PB and the direction distance information DR on the third position PC among direction distance information DR for all angular steps.

The recognition unit 41R first selects direction distance information DR which satisfies conditional expression (1) below among direction distance information DR obtained in a frame unit as first direction distance information DR and accordingly recognizes the first continuous body U1 and the second continuous body U2 along the first route R1 on which the transport machine T travels. The first continuous body U1 and the second continuous body U2 are respectively the first object and the second object which partition the first route R1, such as a wall and a curb.

$$|I\cdot\cos\theta - I_D| < \varepsilon_{TH1} \tag{1}$$

Here, I and $\theta$ respectively denote a spatial distance and an azimuth in the direction distance information DR. $I_D$ denotes a spatial distance included in the direction distance information DR an azimuth $\theta$ of which is 0°. $\varepsilon_{TH1}$ denotes a threshold value for considering that the x direction distance $I\cdot\cos\theta$ of each position is substantially same as the distance $I_D$ and is a value which can be changed by setting.

Figure 4:
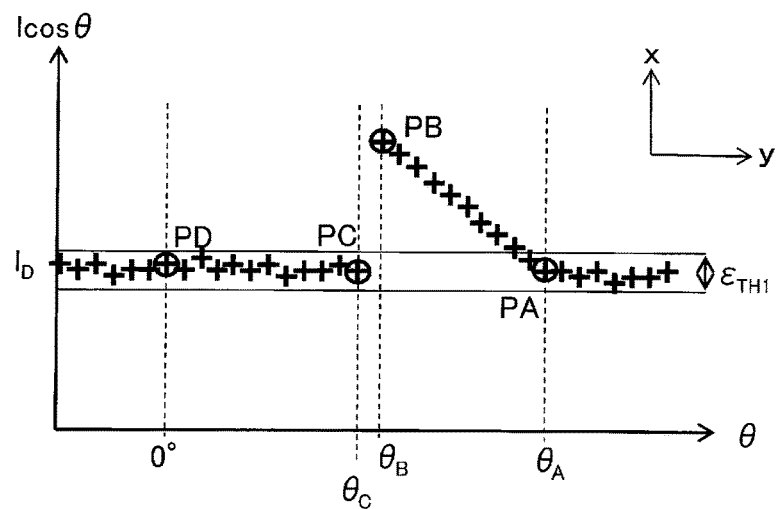
FIG. 4 illustrates an example of direction distance information of all angular steps on a coordinate system having a horizontal axis $\theta$ and a vertical axis $I \cdot \cos \theta$.

Here, FIG. 4 illustrates an example of direction distance information DR for all angular steps on a coordinate system whose horizontal axis is denoted as $\theta$ and whose vertical axis is denoted as $I\cdot\cos\theta$, to facilitate understanding. Since the first route R1 is approximately parallel to the y axis, $I_A \cdot \cos\theta_A$ on the first position PA and $I_C \cdot \cos\theta$ on the third position PC are estimated to be within $\pm\varepsilon_{TH1}$ of the distance $I_D$ of a point PD. The second position PB is defined by the direction distance information DR which is positioned apart from the second continuous body U2 along the first route R1 and has the smallest azimuth $\theta$ among direction distance information DR which do not satisfy the conditional expression (1) above, in the present embodiment. The third position PC is defined by the direction distance information DR which is smaller by one angular step with respect to the second position PB. The first position PA is positioned apart from the third position PC by a predetermined number of (a plurality of) angular steps among first direction distance information DR which satisfy the conditional expression (1). When the recognition unit 41R specifies the first position PA and the third position PC described above based on first direction distance information DR which satisfy the conditional expression (1), the recognition unit 41R recognizes that there is the break zone U4 between the first continuous body U1 and the second continuous body U2. Further, in the case where the recognition unit 41R recognizes that there is the second position PB in direction distance information DR which do not satisfy the conditional expression (1) above, the recognition unit 41R selects direction distance information DR which are mostly distributed between the second position PB and the first position PA as the second direction distance information DR, in the present embodiment.

After selecting the first direction distance information DR and the second direction distance information DR described above, the recognition unit 41R progresses the following processing on the premise that the transport machine T is to next pass through the specific region C having poor visibility.

Further, the recognition unit 41R determines whether or not there is direction distance information DR which satisfies the following conditional expression (2), based on direction distance information DR having the azimuth $\theta$ which is larger than the azimuth $\theta_A$ of the first position PA.

$$|I\cdot\sin\theta - I_A\cdot\sin\theta_A| < \varepsilon_{TH2} \tag{2}$$

Here, $\varepsilon_{TH2}$ denotes a threshold value for determining whether or not the specific region C is a T-junction and is a value which can be changed by setting. Here, in the above expression (2), $\theta_A < \theta < 90°$ is satisfied.

Figure 5:
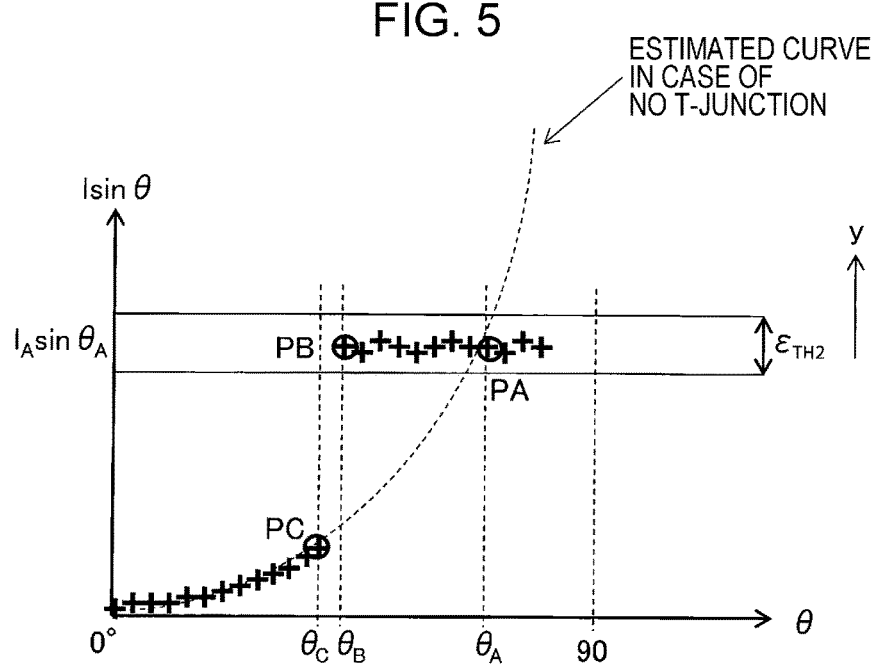
FIG. 5 illustrates an example of direction distance information of all angular steps on a coordinate system having a horizontal axis $\theta$ and a vertical axis $I \cdot \sin \theta$.

FIG. 5 illustrates direction distance information DR for all angular steps on a coordinate system whose horizontal axis is denoted as $\theta$ and whose vertical axis is denoted as $I\cdot\sin\theta$, to facilitate understanding. In the case where the T-junction is constituted of the specific region C, there is a group of direction distance information DR which satisfy the conditional expression (2). In this case, the recognition unit 41R sets a T-junction determination flag with respect to a current frame.

Figure 6:
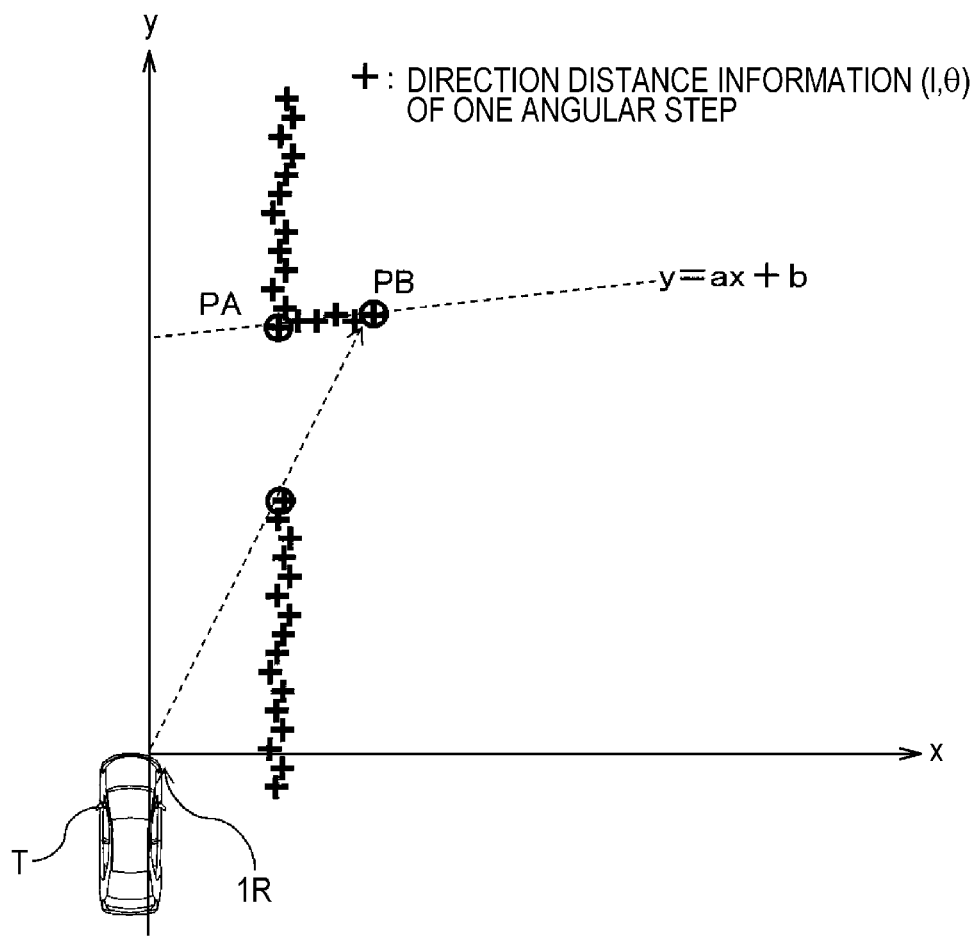
FIG. 6 illustrates an example of an approximation straight line which is a segment obtained by connecting a first position PA and a second position PB.

FIG. 2 is referred to again. After transforming the direction distance information DR which are selected by the recognition unit 41R into xy coordinate values, the information processing unit 42R linearly approximates a plurality of xy coordinate values which are distributed between the first position PA and the second position PB (refer to FIG. 6). In the case where the number of xy coordinate values to be objects corresponds to m angular steps, the information processing unit 42R applies a least squares method, for example, with respect to the xy coordinate values corresponding to the m angular steps so as to obtain an expression of a regression line y=ax+b and obtain a correlation coefficient CC of the xy coordinate values corresponding to the m angular steps.

A calculation process in the information processing unit 42R will be described with reference to FIG. 7. To the information processing unit 42R, data illustrated in FIG. 7(a) is inputted from the recognition unit 41R.

In FIG. 7(b), the information processing unit 42R transforms polar coordinates from $AB_1$ (the point PA) to $AB_m$ (the point PB) and of the point PC into XY coordinates an origin of which is a radar position among the data illustrated in FIG. 7(a). Here, the information processing unit 42R does not process the distance $I_B$ from the radar to the point PB, the distance $I_C$ to the point PC, and the T-junction determination flag.

In FIG. 7(c), the information processing unit 42R calculates the expression of a regression line y=ax+b and the correlation coefficient CC by using m coordinates from $AB_1$ (the point PA) to $AB_m$ (the point PB) among the data illustrated in FIG. 7(b). Here, the information processing unit 42R does not process the XY coordinates of the point PA, the point PB, and the point PC, the distance $I_B$ from the radar to PB, the distance $I_C$ to PC, and the T-junction determination flag.

The information processing unit 42R outputs data illustrated in FIG. 7(c) (that is, the regression line expression, the correlation coefficient CC, the xy coordinate values from the first position PA to the third position PC, the distances $I_B$ and $I_C$ to the second position PB and the third position PC, and the T-junction determination flag) to the occlusion determination unit 45R and the past data buffer unit 43R which are on the following stages.

FIG. 2 is referred to again. In the past data buffer unit 43R, an output result of the information processing unit 42R, data of current speed and steering angle, for example, of the transport machine T, and direction distance information DR for all angular steps (that is, data for one frame) are stored. Here, the past data buffer unit 43R is capable of buffering data for the maximum N frames and accordingly, data for the latest n frames are accumulated when a natural number n which is equal to or smaller than N is set.

Figure 8:
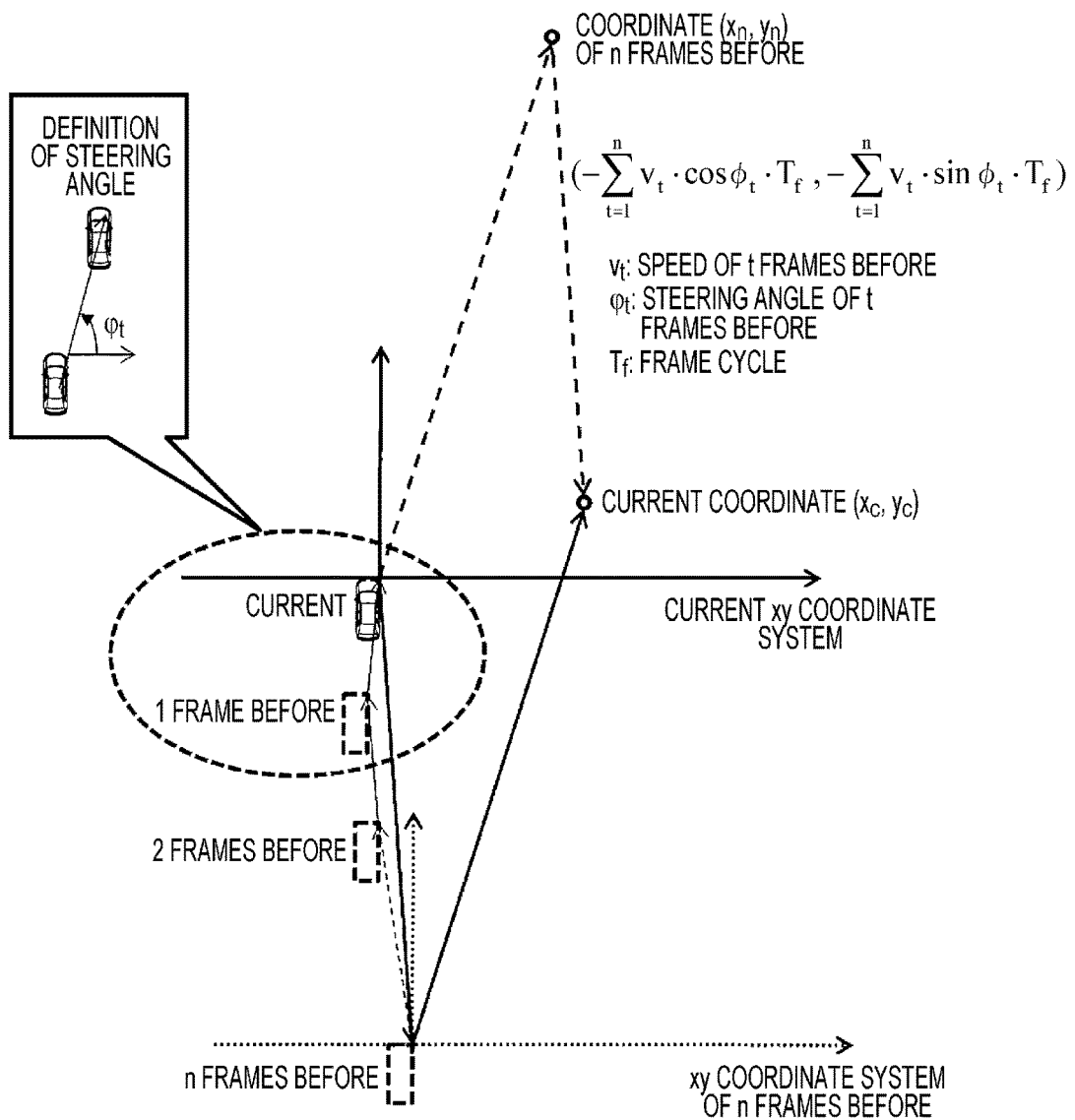
FIG. 8 illustrates an example of a method for transforming direction distance information of n frames before into a current coordinate system.

The coordinate transformation unit 44R transforms xy coordinate values accumulated in the past data buffer unit 43R into values of a current xy coordinate system in a frame unit. In order to facilitate understanding, a method for transforming direction distance information DR of n frames before from the current frame, for example, into a current coordinate system is illustrated in FIG. 8. In FIG. 8, the xy coordinate system of n frames before is shifted to the x-axis direction and the y-axis direction by an amount expressed by the following expression (3) compared to the current xy coordinate system.

$$\left( -\sum_{t=1}^{n} v_t \cdot \cos\phi_t \cdot T_f, -\sum_{t=1}^{n} v_t \cdot \sin\phi_t \cdot T_f \right) \quad (3)$$

Here, $v_t$ denotes a speed of the transport machine T of t frames before. $\phi_t$ denotes a steering angle of t frames before. In the present embodiment, the steering angle represents an azimuth of the current origin P0 with respect to the origin P0 of t frames before. Further, $T_f$ denotes a frame cycle.

Accordingly, when a coordinate value of n frames before is set as $(x_n, y_n)$ and a current xy coordinate value is set as $(x_c, y_c)$, $(x_n, y_n)$ is expressed by the following expression (4).

$$(x_n, y_n) = \left( x_c + \sum_{t=1}^{n} v_t \cdot \cos\phi_t \cdot T_f, y_c + \sum_{t=1}^{n} v_t \cdot \sin\phi_t \cdot T_f \right) \quad (4)$$

FIG. 2 is referred to again. The occlusion determination unit 45R determines presence/absence of the third continuous body U3 (that is, occlusion) along the second route R2 which connects to the specific region C and has poor visibility, based on data output illustrated in FIG. 7 (that is, current data) and data for the past n frames which are accumulated in the past data buffer unit 43R.

Figure 9:
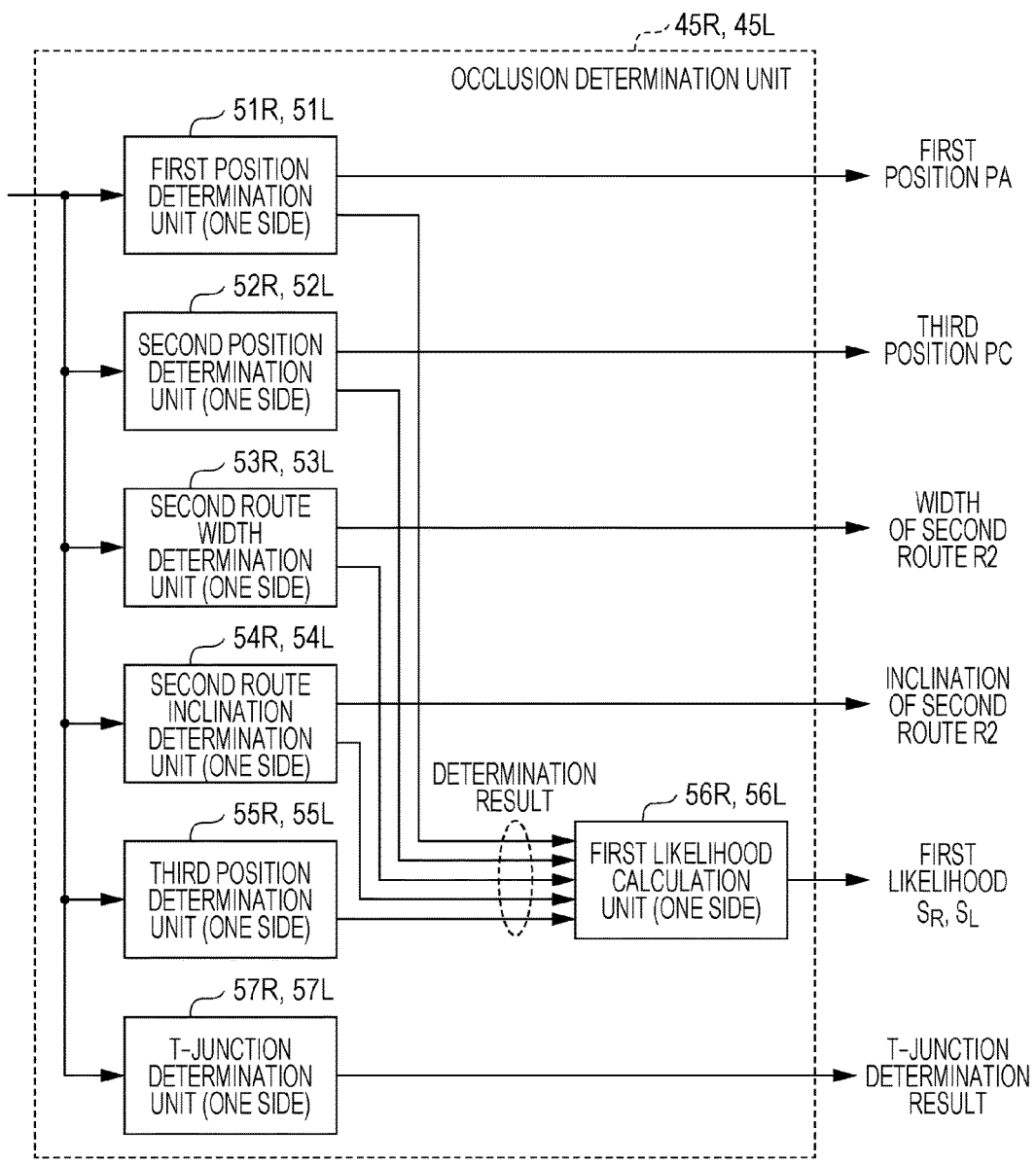
FIG. 9 illustrates an example of an occlusion determination unit of FIG. 2.

The occlusion determination unit 45R includes a first position determination unit 51R, a second position determination unit 52R, a second route width determination unit 53R, a second route inclination determination unit 54R, a third position determination unit 55R, a first likelihood calculation unit 56R, and a T-junction determination unit 57R as functional blocks, as illustrated in FIG. 9, so as to execute occlusion determination and obtain detailed information of the specific region C.

Figure 7:
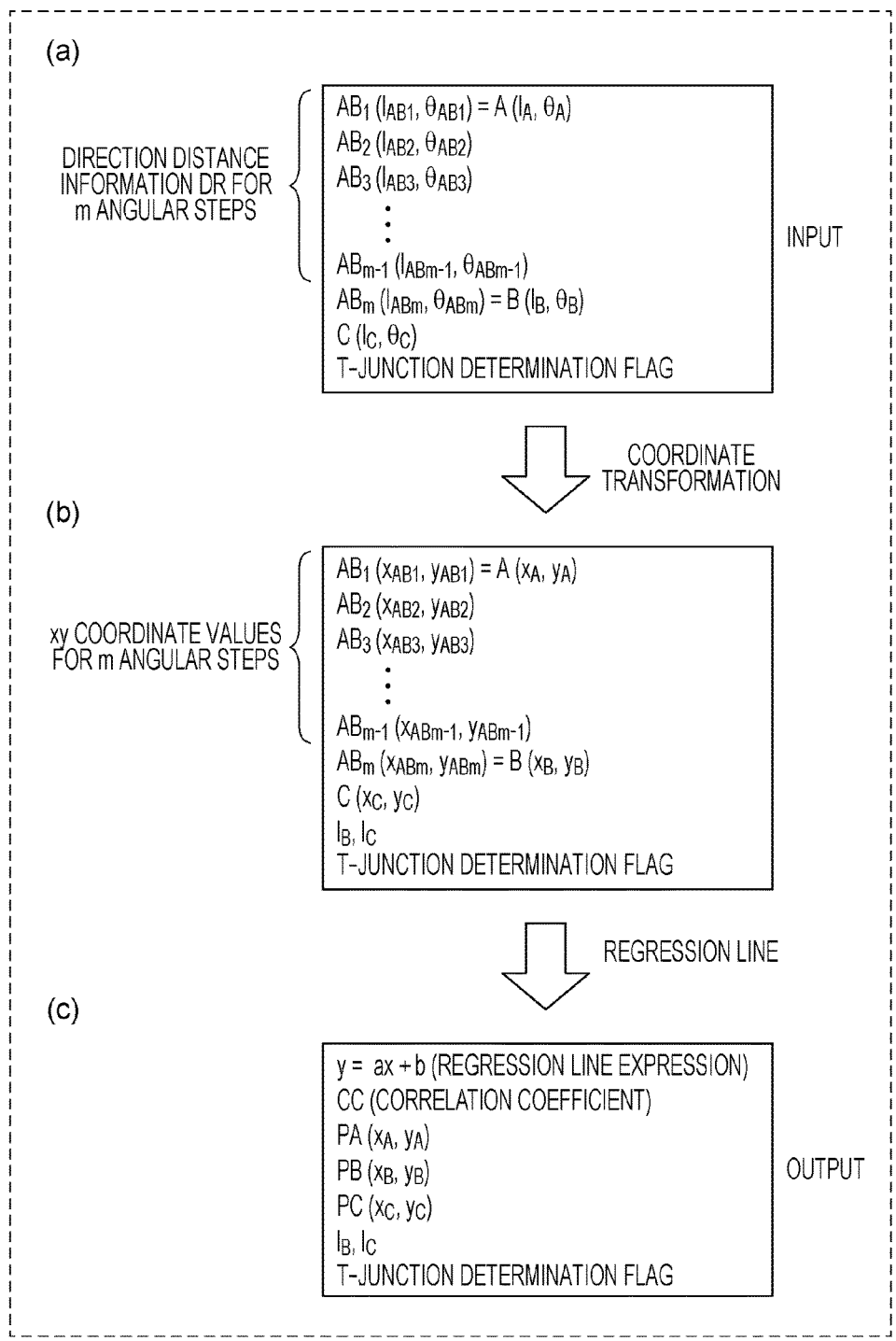
FIG. 7 illustrates an example of output information from an information processing unit of FIG. 2.

The first position determination unit 51R determines whether or not an xy coordinate of the first position PA (a corner on a farther side of the specific region C or a left end of the third continuous body U3) keeps indicating the same position throughout n+1 frames, based on the data output illustrated in FIG. 7 (that is, current data) and the data for the past n frames which are accumulated in the past data buffer unit 43R. Specifically, a standard deviation ($\sigma_{AX}$, $\sigma_{AY}$) of each of coordinates $PA_0$ ($x_{A0}, y_{A0}$), $PA_1$ ($x_{A1}, y_{A1}$), $PA_2$ ($x_{A2}, y_{A2}$), ..., $PA_n$ ($x_{An}, y_{An}$) is first calculated. In the case where $\sigma_{AX} < \Sigma_A$ and $\sigma_{AY} < \Sigma_A$ are satisfied, it is determined that the position of the first position PA has not changed. Here, $\Sigma_A$ denotes a threshold value for considering that a position indicated by the first position PA has not substantially changed and is a parameter which can be arbitrarily changed by setting. The first position determination unit 51R outputs a determination result to the first likelihood calculation unit 56R and outputs an average value of the coordinates $PA_0$ ($x_{A0}, y_{A0}$) to $PA_n$ ($x_{An}, y_{An}$) (an xy coordinate value of the first position PA) to the specific region determination unit 32.

The second position determination unit 52R determines whether or not an xy coordinate of the third position PC keeps indicating the same position throughout n+1 frames, based on the data output illustrated in FIG. 7 (that is, current data) and the data for the past n frames which are accumulated in the past data buffer unit 43R. Specifically, the second position determination unit 52R first calculates a standard deviation ($\sigma_{CX}$, $\sigma_{CY}$) of each of coordinates $PC_0$ ($x_{C0}, y_{C0}$), $PC_1$ ($x_{C1}, y_{C1}$), $PC_2$ ($x_{C2}, y_{C2}$), ..., $PC_n$ ($x_{Cn}, y_{Cn}$). In the case where the standard deviation ($\sigma_{CX}$, $\sigma_{CY}$) satisfies $\alpha_{CX} < \Sigma_C$ and $\sigma_{CY} < \Sigma_C$, the second position determination unit 52R determines that the position of the third position PC (an end portion on a front side of the specific region) has not changed. Here, $\Sigma_C$ denotes a threshold value for considering that a position indicated by the third position PC has not substantially changed and is a parameter which can be arbitrarily changed by setting. The second position determination unit 52R outputs a determination result to the first likelihood calculation unit 56R and outputs an average value of the coordinates $PC_0$ ($x_{C0}, y_{C0}$) to $PC_n$ ($x_{Cn}, y_{Cn}$) (an xy coordinate value of the third position PC) to the specific region determination unit 32.

The second route width determination unit 53R determines a possibility of appearance of another moving body from the second route R2 toward the specific region C. Specifically, the second route width determination unit 53R calculates the distance AC between the first position PA and the third position PC (for example, $AC_0$) based on xy coordinate values of the first position PA and the third position PC of the same frame (for example, coordinates $PA_0$ and $PC_0$). Subsequently, the second route width determination unit 53R calculates an average value $AC_{AVE}$ of the distances $AC_0$ to $AC_n$ for n+1 frames. In the case where $AC_{MIN} \leq AC_{AVE} \leq AC_{MAX}$ is satisfied, the second route width determination unit 53R determines that another moving body is highly likely to appear from the second route R2 and outputs the average value $AC_{AVE}$. Specifically, the second route width determination unit 53R outputs a determination result to the first likelihood calculation unit 56R and outputs the average value $AC_{AVE}$ as the width of the second route R2 to the specific region determination unit 32.

Here, $AC_{MIN}$ is selected as such a small value that there is no possibility that another moving body appears from the second route R2 and $AC_{MAX}$ is selected as such a large value that another moving body appearing from the second route R2 can be favorably seen. Here, $AC_{MIN}$ and $AC_{MAX}$ are parameters which can be arbitrarily changed by setting.

The second route inclination determination unit 54R determines whether or not the third continuous body U3 based on the first position PA extends toward a different direction from that of the second continuous body U2 (that is, whether or not the regression line extends as estimated) when the transport machine T moves. In particular, the second route inclination determination unit 54R examines how much the degree of proximity between the second position PB and the regression line does not change during n+1 frames. For example, the regression line of one frame before is set as y=ax+b and a coordinate of the second position PB is set as $(x_B, y_B)$, the distance E between the regression line and the second position PB is expressed by expression (5) below.

$$E = \frac{|ax_B - y_B + b|}{\sqrt{1 + a^2}} \quad (5)$$

In the case where the distance E obtained by the expression (5) above satisfies $E < \varepsilon_{LEAN}$ and the transport machine T moves, the second route inclination determination unit 54R determines that the third continuous body U3 based on the first position PA extends to a direction different from that of the second continuous body U2. Here, $\varepsilon_{LEAN}$ denotes a threshold value for considering that the distances E calculated in a frame unit are distances same as each other and is a parameter which can be arbitrarily changed by setting. The second route inclination determination unit 54R outputs a determination result to the first likelihood calculation unit 56R and outputs the inclination of the current regression line as the inclination of the third continuous body U3 (that is, the second route R2) to the specific region determination unit 32.

Figure 10:
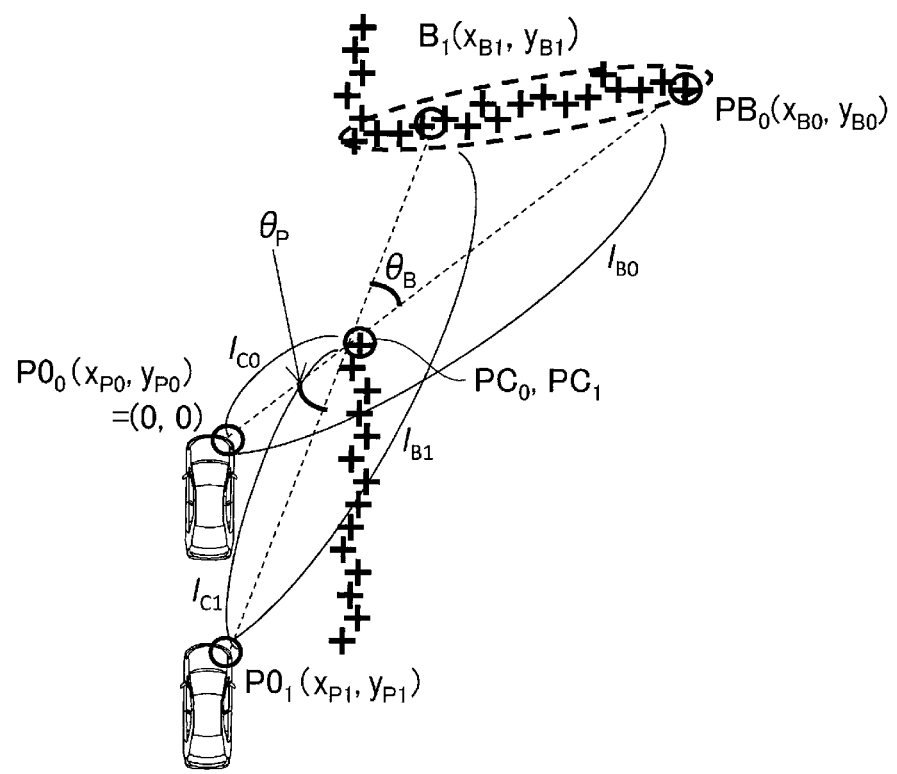
FIG. 10 illustrates an example of processing of a third position determination unit of FIG. 9.

The third position determination unit 55R determines whether or not elongation of the length of the third continuous body U3 based on the first position PA is equal to or more than a predetermined value when the transport machine T moves. In particular, as illustrated in FIG. 10, a current coordinate of the second position PB is set as $PB_0$ $(x_{B0}, y_{B0})$, a coordinate of the third position PC is set as $PC_0$ $(x_{C0}, y_{C0})$, a coordinate of the current position P0 of the transport machine T is set as $P0_0$ $(x_{P0}, y_{P0})$ $(x_{P0}=y_{P0}=0)$, the length $P0_0PC_0$ is denoted as $l_{C0}$, the length $P0_0PB_0$ is denoted as $l_{B0}$, a coordinate of the second position PB of one frame before is set as $B_1$ $(x_{B1}, y_{B1})$, a coordinate of the third position PC is set as $C_1$ $(x_{C1}, y_{C1})$, a coordinate of the position P0 of the transport machine T of one frame before is set as $P0_1$ $(x_{P1}, y_{P1})$, the length $P0_1C_1$ is denoted as $l_{C1}$, and the length $P0_1B_1$ is denoted as $l_{B1}$. Further, the angle $P0_0PC_0P0_1$ is denoted as $\theta_P$ and the angle $PB_0PC_0B_1$ is denoted as $\theta_B$. In this case, expressions (6) and (7) below are obtained.

$$\cos \theta_P = \frac{l_{C0}^2 + l_{C1}^2 - ((x_{P0} - x_{P1})^2 + (y_{P0} - y_{P1})^2)}{2 \cdot l_{C0} \cdot l_{C1}} \quad (6)$$

$$\cos \theta_B = \frac{l_{BC0}^2 + l_{BC1}^2 - ((x_{B0} - x_{B1})^2 + (y_{B0} - y_{B1})^2)}{2 \cdot l_{BC0} \cdot l_{BC1}} \quad (7)$$

Here, $l_{BC0}$ is expressed as $l_{BC0}=l_{BC0}-l_{C0}$ and $l_{BC1}$ is expressed as $l_{BC1}=l_{BC1}-l_{C1}$.

In the case where $\cos \theta_P$ and $\cos \theta_B$ calculated by using the above expressions (6) and (7) for each frame satisfy $|\cos \theta_P - \cos \theta_B| < \varepsilon_{OCL}$ and the transport machine T moves, the third position determination unit 55R determines that the length of the third continuous body U3 based on the first position PA has increased by a predetermined value or more. Here, $\varepsilon_{OCL}$ denotes a threshold value for considering that the second position PB is moved by the substantially same distance as the transport machine T and is a parameter which can be arbitrarily changed by setting. The third position determination unit 55R outputs a determination result to the first likelihood calculation unit 56R.

The first likelihood calculation unit 56R calculates a first likelihood $S_R$ which represents whether or not the second route R2 connects with the first route R1 at the specific region C ahead, based on the outputs of the functional blocks 51R to 55R. Table 1 illustrates an example of a method for calculating a likelihood. In the first likelihood calculation unit 56R, points are preliminarily set with respect to various determination items (in other words, the functional blocks 51R to 55R). A point value can be arbitrarily changed. Each of the functional blocks 51R to 55R sets 1 with respect to a positive determination result and sets 0 with respect to a negative determination result. The first likelihood calculation unit 56R multiplies a determination result by a point value for each of the determination items so as to output a sum of multiplied values as the first likelihood $S_R$.

TABLE 1

Example of likelihood calculation method

| Determination item | Point | Example of determination result (1/0) | Likelihood |
|---|---|---|---|
| Position of first position PA (first position determination) | 10 | 1 | 10 |
| Position of third position PC (second position determination) | 10 | 1 | 10 |
| Second route width determination | 10 | 0 | 0 |
| Second route inclination determination | 10 | 1 | 10 |
| Position of second position PB (third position determination) | 10 | 0 | 0 |
| Sum (first likelihood $S_R$) | — | — | 30 |

The T-junction determination unit 57R determines whether or not there is a possibility that the specific region C ahead is a T-junction, based on T-junction determination flags of a current frame and past n frames and outputs the determination result. In the present embodiment, when more than half of the T-junction determination flags of the n+1 frames are 1, the T-junction determination unit 57R outputs 1 as a determination result representing presence of a possibility of a T-junction. When more than half of the T-junction determination flags are not 1, the T-junction determination unit 57R outputs 0.

The processing of the occlusion detection unit 31R has been described above in detail. In the present embodiment, the occlusion determination unit 45R determines whether or not the second route R2 with poor visibility connects with the specific region C ahead, and outputs a position of the first position PA (a corner on a farther side of the specific region C or a left end of the second route R2), a position of the third position PC (a corner on a front side of the specific region C), and the width and the inclination of the second route R2 in addition to the first likelihood $S_R$, as respects the second route R2, to the specific region determination unit 32 (refer to FIG. 2).

Here, the transport machine T further includes the direction distance sensor 1L as described above. The direction distance sensor 1L is attached on a symmetrical position to the direction distance sensor 1R based on a longitudinal center surface of the transport machine T, for example, and outputs direction distance information DL similar to the direction distance information DR.

Further, the input unit 21 receives the direction distance information DL from the direction distance sensor 1L and forwards the direction distance information DL to the SRAM 24. The occlusion detection unit 31L executes a method similar to that of the occlusion detection unit 31R with respect to the direction distance information DL, and outputs a position of the first position PA, a position of the third position PC, and the width and the inclination of the second route in addition to the first likelihood $S_L$, as respects the second route which connects to the specific region from the left side, to the specific region determination unit 32 (refer to FIG. 2). Here, the detailed configuration of an occlusion determination unit 45L of the occlusion detection unit 31L is illustrated with reference characters with suffix L in FIG. 9.

FIG. 2 is referred to again. The specific region determination unit 32 calculates a final second likelihood $S_{out}$ relating to the specific region C, based on outputs of the occlusion detection units 31R and 31L. Further, the specific region determination unit 32 outputs a distance from the transport machine T to the specific region C, a shape of the specific region C, the width of an entering part from the first route R1 to the specific region C, the width of the second route R2, and an angle of the second route R2 with respect to the first route R1. Here, in the case where the direction distance sensors 1R and 1L are provided to the transport machine T as the present embodiment, the specific region determination unit 32 may output data relating to the second route R2 which connects to the specific region C from both of right and left sides. The specific region determination unit 32 will be detailed below with reference to FIG. 11.

Figure 11:
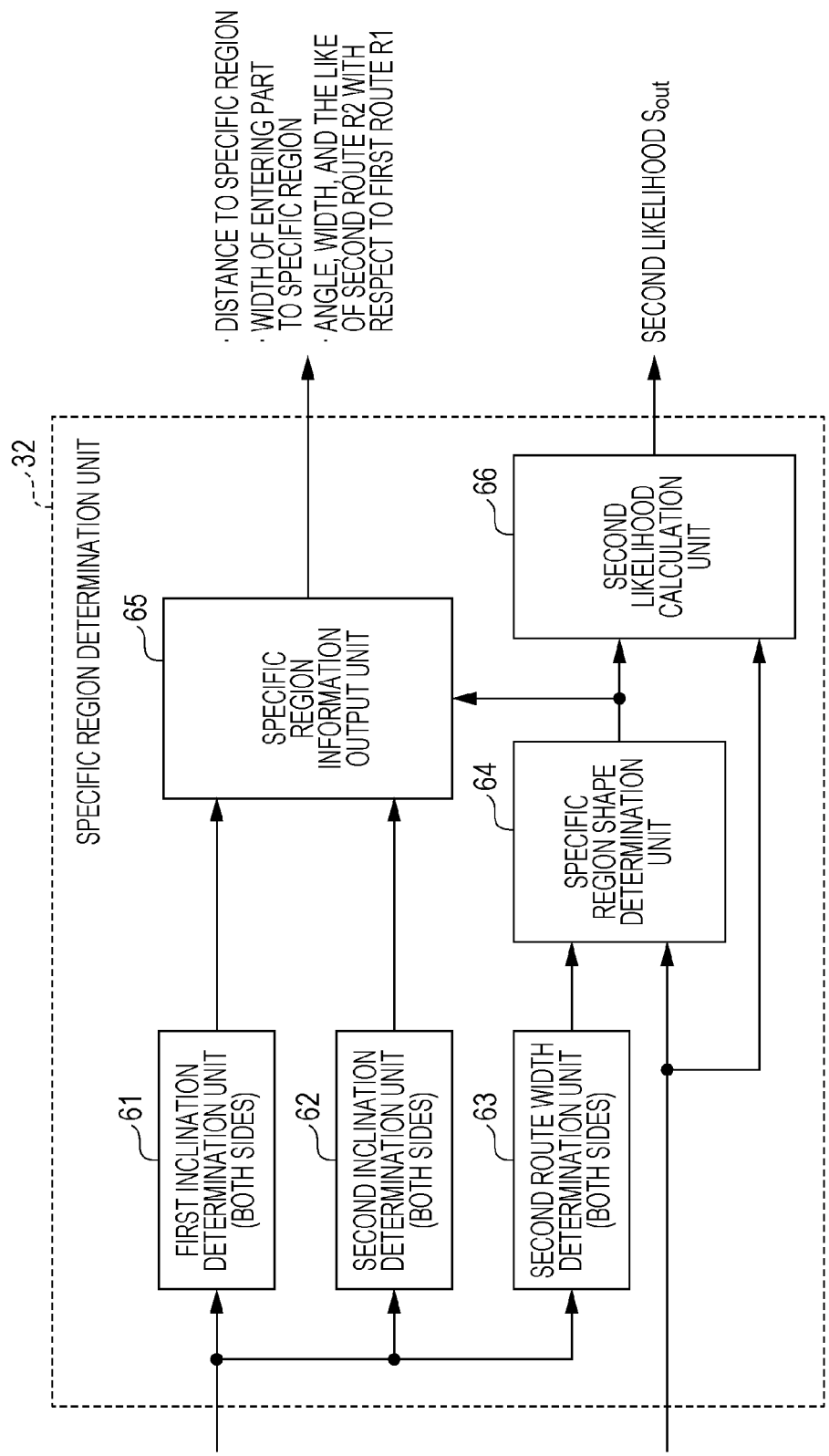
FIG. 11 illustrates an example of a specific region determination unit of FIG. 2.

The specific region determination unit 32 includes a first inclination determination unit 61, a second inclination determination unit 62, a second route width determination unit 63, a specific region shape determination unit 64, a specific region information output unit 65, and a second likelihood calculation unit 66, as illustrated in FIG. 11.

The first inclination determination unit 61 determines whether or not the second routes R2 on the left and right sides are approximately on the same straight line. In particular, when a coordinate of the first position PA on the left side and a coordinate of the first position PA on the right side are first set as $(x_{AL}, y_{AL})$ and $(x_{AR}, y_{AR})$ respectively, the inclination $L_M$ of a segment obtained by connecting these first positions PA is obtained by expression (8) below.

$$L_M = \frac{y_{AR} - y_{AL}}{x_{AR} - x_{AL}} \quad (8)$$

Further, the first inclination determination unit 61 determines whether the inclination of the second route R2 on the left side is closer to the inclination $L_M$ or the inclination of the second route R2 on the right side is closer to the inclination $L_M$. When the inclination of the second route R2 on the left side is denoted as $L_L$ and the inclination of the second route R2 on the right side is denoted as $L_R$, a determination result of the first inclination determination unit 61 is obtained as Table 2 below in the present embodiment.

TABLE 2

| Determination result of first inclination determination unit 61 | | |
|---|---|---|
| | $\|L_L - L_M\| < L_{th1}$ or $\|L_R - L_M\| < L_{th1}$ | Other than the left |
| $L_M \geq 0$ | 1: There is possibility of crossroads intersection | 2: T-junction (there is second route R2 on left side) |
| $L_M < 0$ | | 3: T-junction (there is second route R2 on right side) |

Figure 12A:
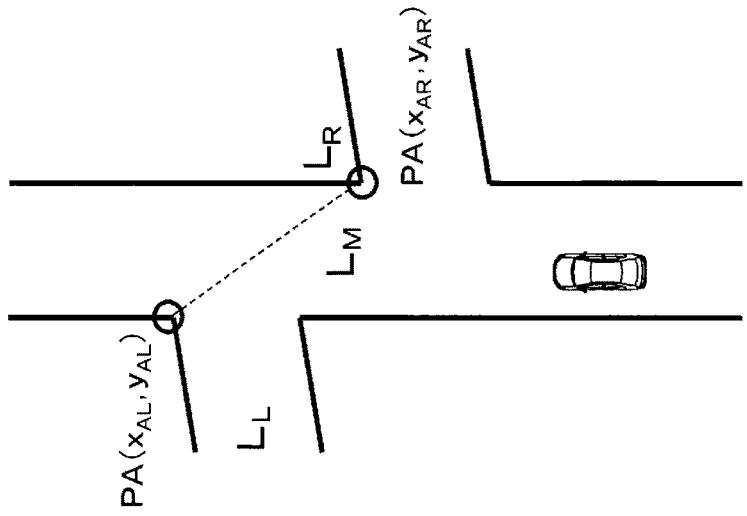
FIGS. 12A to 12C illustrate an example of a determination result of a first inclination determination unit of FIG. 11.

(State 1) In the case where $L_L$ and $L_M$ are approximately the same (that is, $|L_L - L_M| < L_{th1}$) or the case where $L_R$ and $L_M$ are approximately the same (that is, $|L_R - L_M| < L_{th1}$) as illustrated in FIG. 12A, the first inclination determination unit 61 outputs 1 as a determination result as shown in Table 2 above. Further, determination result 1 represents a possibility that the specific region is a crossroads intersection.

Figure 12B:
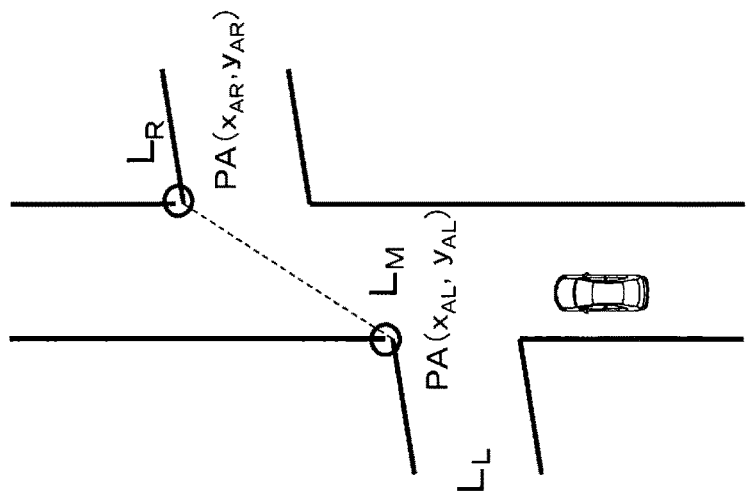

(State 2) In the case where the state is not (state 1) and $L_M \geq 0$ as illustrated in FIG. 12B, a determination result is 2 as shown in Table 2 above. In the definition of determination result 2, there is a possibility that the intersection ahead is a T-junction having a crossroad on the left side (T-junction having left exit and straight exit).

Figure 12C:
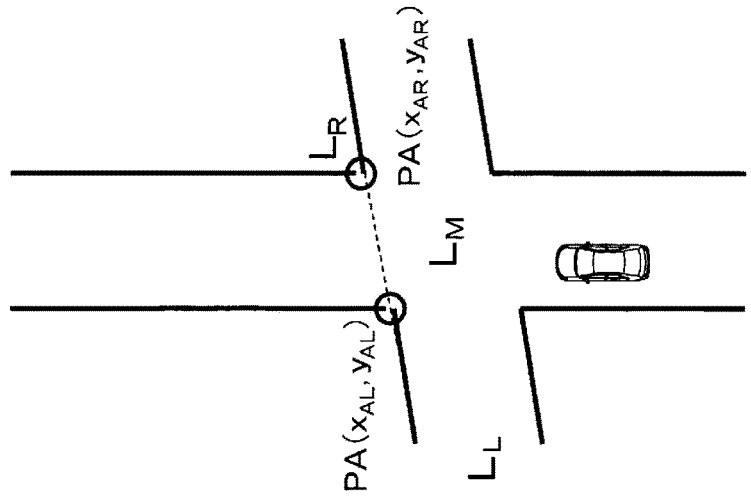

(State 3) In the case where the state is not (state 1) and $L_M < 0$ as illustrated in FIG. 12C, a determination result is 3 as shown in Table 2 above. In the definition of determination result 3, there is a possibility that the intersection ahead is a T-junction having a crossroad on the right side (T-junction having right exit and straight exit).

Here, $L_{th1}$ denotes a threshold value for considering that the left and right crossroads are on the same straight line and is a parameter which can be arbitrarily changed by setting.

The second inclination determination unit 62 determines whether or not the inclination of the second route R2 on the left side and the inclination of the second route R2 on the right side are not largely different from each other. Specifically, in the case where $|L_L - L_R| < L_{th2}$ is satisfied, the second inclination determination unit 62 determines that the inclinations of both crossroads are not largely different from each other. Here, $L_{th2}$ is a parameter which can be arbitrarily changed by setting.

The second route width determination unit 63 determines whether or not the widths of the second routes R2 on the left and right sides are not largely different from each other. Specifically, in the case where $|D_L - D_R| < D_{th}$ is satisfied when the width of the second route R2 on the left side and the width of the second route R2 on the right side are respectively denoted as $D_L$ and $D_R$, the second route width determination unit 63 determines that the widths of the left and right crossroads are not largely different from each other. Here, $D_{th}$ denotes a threshold value for considering that the widths of the left and right crossroads are not largely different from each other and is a parameter which can be arbitrarily changed by setting.

The specific region shape determination unit 64 selects a shape of the specific region corresponding to first likelihoods $S_L$ and $S_R$ of the second routes R2 on the left and right sides (outputs of the first likelihood calculation unit 56R and the like), left and right T-junction determination results (outputs of the T-junction determination unit 57R and the like), and a determination result of the first inclination determination unit 61, from a table preliminarily held (refer to Table 3 below) so as to determine a shape of the intersection ahead and output a determination result among determination results 1 to 7 shown below.

According to Table 3, in the case where both of the left and right T-junction determination results are 0, further, the determination result of the first inclination determination unit 61 is 1, and the first likelihoods $S_L$ and $S_R$ exceed the threshold value $S_{th}$, the specific region shape determination unit 64 determines the specific region as a crossroads intersection and outputs 1 as a determination result. Here, $S_{th}$ denotes a threshold value for determining that the likelihoods $S_L$ and $S_R$ are large and is a parameter which can be arbitrarily changed by setting.

Further, according to Table 3, in the case where both of the left and right T-junction determination results are 0, further, the determination result of the first inclination determination unit 61 is 2, and the first likelihoods $S_L$ and $S_R$ exceed the threshold value $S_{th}$, the specific region shape determination unit 64 determines the specific region as a left T-junction and outputs 2 as a determination result.

Further, according to Table 3, in the case where neither of the left and right T-junction determination results are 0, further, the determination result of the first inclination determination unit 61 is 1, and the first likelihoods $S_L$ and $S_R$ exceed the threshold value $S_{th}$, the specific region shape determination unit 64 determines the specific region as a lower T-junction (T-junction having left exit and right exit) and outputs 4 as a determination result.

Shapes of the specific region corresponding to other conditions are shown in Table 3.

TABLE 3

Example of determination result of specific region shape determination unit 64

| Left and right T-junction determination results | Determination result of first inclination determination unit 61 | Determination result of specific region shape determination unit 64 | | | |
|---|---|---|---|---|---|
| | | $S_L > S_{th}$ and $S_R > S_{th}$ | $S_L > S_{th}$ and $S_R \leq S_{th}$ | $S_L \leq S_{th}$ and $S_R > S_{th}$ | $S_L \leq S_{th}$ and $S_R \leq S_{th}$ |
| 0 | 1 | 1: Crossroads intersection | 2: Left T-junction | 3: Right T-junction | 0: No intersection |
| | 2 | 2: Left T-junction | | | |
| | 3 | 3: Right T-junction | | | |
| Other than 0 | 1 | 4: Lower T-junction | 5: Left L-junction | 6: Right L-junction | 7: Others (unclear) |
| | 2 | 7: Others (unclear) | | | |
| | 3 | | | | |

The specific region information output unit 65 outputs detailed information which can be derived from the first positions PA of the left and right second routes R2, the third position PC, the inclination, and the width (that is, a distance to the specific region, the width of an entering part to the specific region, an angle and the width of the second route R2 with respect to the first route R1, and the like) in addition to the determination result by the specific region shape determination unit 64. An output example of the specific region information output unit 65 is shown in Table 4.

TABLE 4

Output example of specific region information output unit 65

| Shape of specific region | Distance to specific region | Width of entering part | Angle of second route | Width of second route |
|---|---|---|---|---|
| 0: No intersection | No output | No output | No output | No output |
| 1: Crossroads intersection | $(y_{CL} + y_{CR})/2$ | $|x_{AR}| + |x_{AL}| + R_{LR}$ | $\tan^{-1}((L_L + L_R)/2)$ | $(D_L + D_R)/2$ |
| 2: Left T-junction | $y_{CL}$ | No output | $\tan^{-1}L_L$ | $D_L$ |
| 3: Right T-junction | $y_{CR}$ | No output | $\tan^{-1}L_R$ | $D_R$ |
| 4: Lower T-junction | $(y_{CL} + y_{CR})/2$ | No output | $\tan^{-1}((L_L + L_R)/2)$ | $(D_L + D_R)/2$ |
| 5: Left L-junction | $y_{CL}$ | No output | $\tan^{-1}L_L$ | $D_L$ |
| 6: Right L-junction | $y_{CR}$ | No output | $\tan^{-1}L_R$ | $D_R$ |

TABLE 4-continued

Output example of specific region information output unit 65

| Shape of specific region | Distance to specific region | Width of entering part | Angle of second route | Width of second route |
|---|---|---|---|---|
| 7: Others (unclear) | No output | No output | No output | No output |

In Table 4 above, $y_{CL}$ denotes a y coordinate on the third position PC of the second route R2 on the left side, $y_{CR}$ denotes a y coordinate on the third position PC of the second route R2 on the right side, $x_{AL}$ denotes an x coordinate on the first position PA of the second route R2 on the left side, and $x_{AR}$ denotes an x coordinate on the first position PA of the second route R2 on the right side. Further, $R_{LR}$ denotes an interval between attachment positions of the direction distance sensors 1R and 1L, $L_L$ and $L_R$ denote inclinations of the left side crossroad and the right side crossroad, and $D_L$ and $D_R$ denote the widths of the left side crossroad and the right side crossroad.

The second likelihood calculation unit 66 adds an additional value based on the determination results obtained in the second inclination determination unit 62, the second route width determination unit 63, and the specific region shape determination unit 64 to the first likelihoods $S_R$ and $S_L$ from the first likelihood calculation units 56R and 56L so as to calculate the second likelihood $S_{out}$ with respect to the specific region. Table 5 shows an example of a method for calculating an additional value. In the second likelihood calculation unit 66, points (for example, 10 points) are set with respect to determination items (in other words, the second inclination determination unit 62 and the second route width determination unit 63). A value of a point can be arbitrarily changed. The second inclination determination unit 62 and the second route width determination unit 63 set 1 with respect to a positive determination result and set 0 with respect to a negative determination result. The second likelihood calculation unit 66 multiplies a value of a determination result by a point for each of the determination items so as to output a sum of multiplied values as an additional value.

TABLE 5

Example of additional value calculation method

| Determination item | Point | Example of determination result (1/0) | Likelihood |
|---|---|---|---|
| Difference between inclinations of left and right crossroads | 10 | 1 | 10 |
| Difference between widths of left and right crossroads | 10 | 0 | 0 |
| Sum (additional value) | — | — | 10 |

Further, the second likelihood calculation unit 66 calculates the second likelihood (output value) $S_{out}$ with respect to the intersection ahead, in accordance with an arithmetic expression defined for every determination result of the specific region shape determination unit 64. Table 6 shows an example of a method for calculating the second likelihood.

TABLE 6

Example of second likelihood calculation method

| Shape of intersection | Second likelihood $S_{out}$ |
|---|---|
| 0: No intersection | No output |
| 1: Crossroads intersection | $S_{out} = S_L + S_R + S_M$ |
| 2: Left T-junction | $S_{out} = S_L$ |
| 3: Right T-junction | $S_{out} = S_R$ |
| 4: Lower T-junction | $S_{out} = S_L + S_R + S_M$ |
| 5: Left L-junction | $S_{out} = S_L$ |
| 6: Right L-junction | $S_{out} = S_R$ |
| 7: Others (unclear) | No output |

FIG. 1 is referred to. The control unit 22 controls each unit based on the final second likelihood $S_{out}$ obtained by the above-mentioned method. For example, in the case where the second likelihood $S_{out}$ obtained as the second likelihood calculation unit 66 is larger than a predetermined threshold value, the control unit 22 may display information obtained as the specific region information output unit 65 on a display device, which is an example of the moving body control device 3, via the output unit 25. In addition, in the case where the transport machine T can be automatically operated and the second likelihood $S_{out}$ obtained as the second likelihood calculation unit 66 is larger than a predetermined threshold value, the control unit 22 may output information for automatically slowing down a speed of the transport machine T to an automatic traveling control device, which is another example of the moving body control device 3, via the output unit 25.

<<1-4. Operation and Effect of Embodiment>>

As described above, according to the present embodiment, the determination device 2 receives the direction distance information DR and DL which represent a distance between the transport machine T and an object existing around the transport machine T from the direction distance sensors 1R and 1L respectively via the input unit 21. In the control unit 22, the occlusion detection units 31R and 31L recognize the first continuous body U1 and the second continuous body U2 along the first route R1 on which the transport machine T travels, from the received direction distance information DR and DL, based on the above-mentioned expression (1). Subsequently, in the case where the occlusion detection units 31R and 31L specify the first position PA and the third position PC from first direction distance information DR which satisfies the conditional expression (1), the occlusion detection units 31R and 31L recognize that there is a break zone between the first continuous body U1 and the second continuous body U2.

Further, in the case where the occlusion detection units 31R and 31L recognize that the second position PB is in direction distance information DR which does not satisfy the conditional expression (1) above, the occlusion detection units 31R and 31L determine the following two points on the premise that the transport machine T is to pass the specific region C with poor visibility from now. Whether or not the third continuous body U3 based on the first position PA extends to a different direction from that of the second continuous body U2 is determined as the first point, and whether or not the elongation of the length of the third continuous body U3 based on the first position PA is equal to or larger than a predetermined value is determined as the second point.

In the case where the length of the third continuous body U3 extending in the direction different from that of the second continuous body U2 from the first position PA is equal to or larger than the predetermined value as a result of this determination, the occlusion detection units 31R and 31L output a detection result relating to the second route R2. This detection result serves as a foundation for the second likelihood $S_{out}$ which is used in a control device (a display device displaying various types of information or a control device for automatic operation, for example) mounted on the transport machine T.

Thus, this determination device 2 is capable of detecting the connection of the second route R2 having poor visibility to the specific region C through the above-described processing. Further, the determination device 2 is capable of outputting many detailed information about the specific region C which are favorable for an operator or automatic operation of the transport machine T. For example, an operator or the like of the transport machine T can grasp a shape of and the distance to a specific region existing before entering the specific region.

<<1-5. Additional Statement>>

In the above embodiment, it is described that the transport machine T includes the direction distance sensors 1R and 1L and the determination device 2. However, in the case where the transport machine T is a probe car on which the direction distance sensors 1R and 1L are mounted, for example, the determination device 2 may be implemented on a server device which is provided to be remote from this probe car in a data-communicable manner. Here, the description in the item 1-5 is applicable to modification of the item 2 below.

2. Modification

A determination device and a determination method according to a modification of the above-described embodiment will now be described.

<<2-1. Configuration of Determination Device and Peripheral Configurations>>

Figure 13:
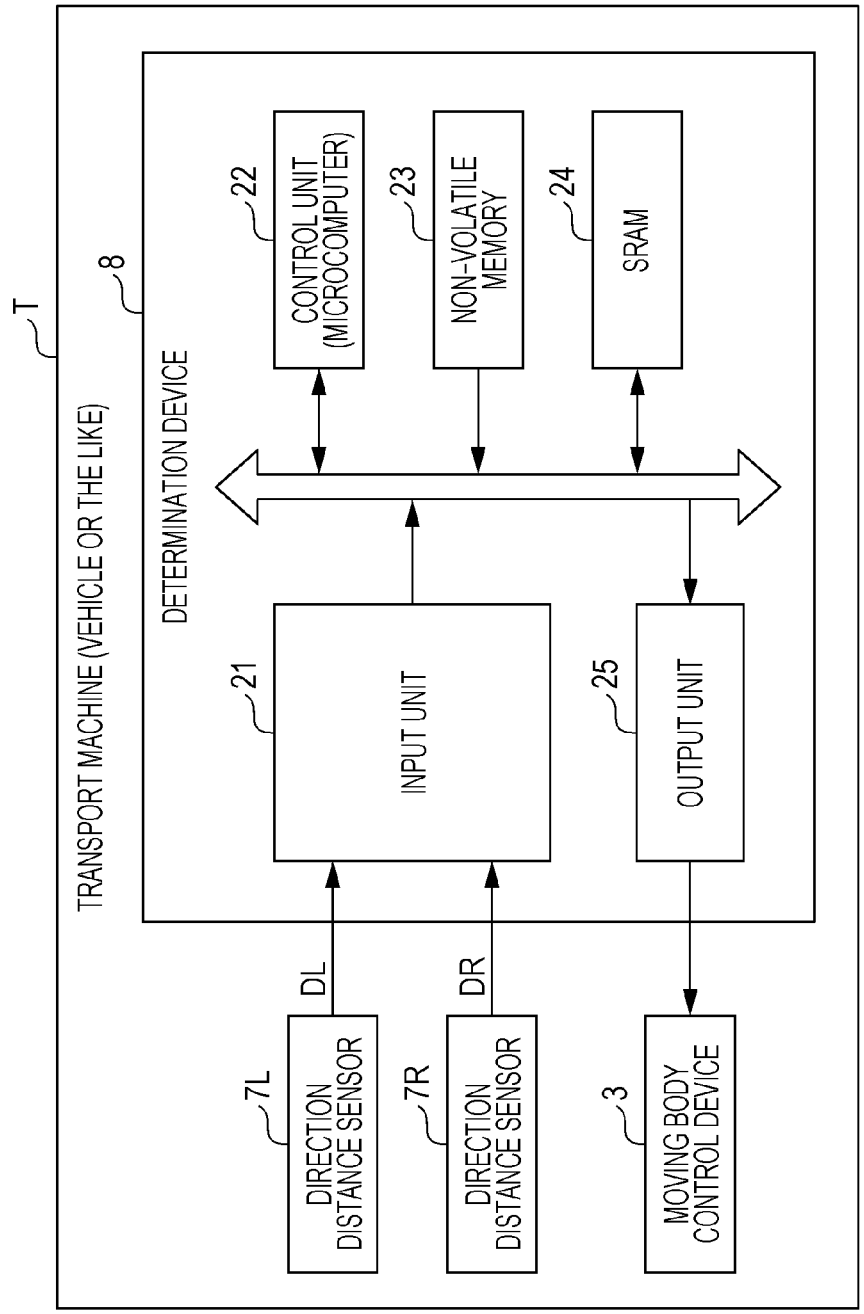
FIG. 13 illustrates an example of the hardware configuration of a determination device according to a modification.

As illustrated in FIG. 13, a determination device 8 according to the modification is connected with direction distance sensors 7R and 7L in a communicable manner. In the present modification as well, an example in which the direction distance sensors 7R and 7L and the determination device 8 are mounted on a vehicle is described.

The direction distance sensor 7R generates direction distance information DR for every frame cycle so as to output the direction distance information DR to the determination device 8 as is the case with the direction distance sensor 1R described above. Further, it is preferable that after detecting and capturing a moving body (a human or another transport machine) within a measurable range, the direction distance sensor 7R assigns a tracking ID to this moving body so as to be able to track the moving body through a plurality of frames.

There is no difference in an aspect of the hardware configuration when the determination device 8 is compared to the determination device 2. Therefore, components corresponding to those in the configuration of FIG. 1 are denoted with the same reference characters in FIG. 13 and description of these components will be omitted.

<<2-2. Functional Blocks of Control Unit>>

Figure 14:
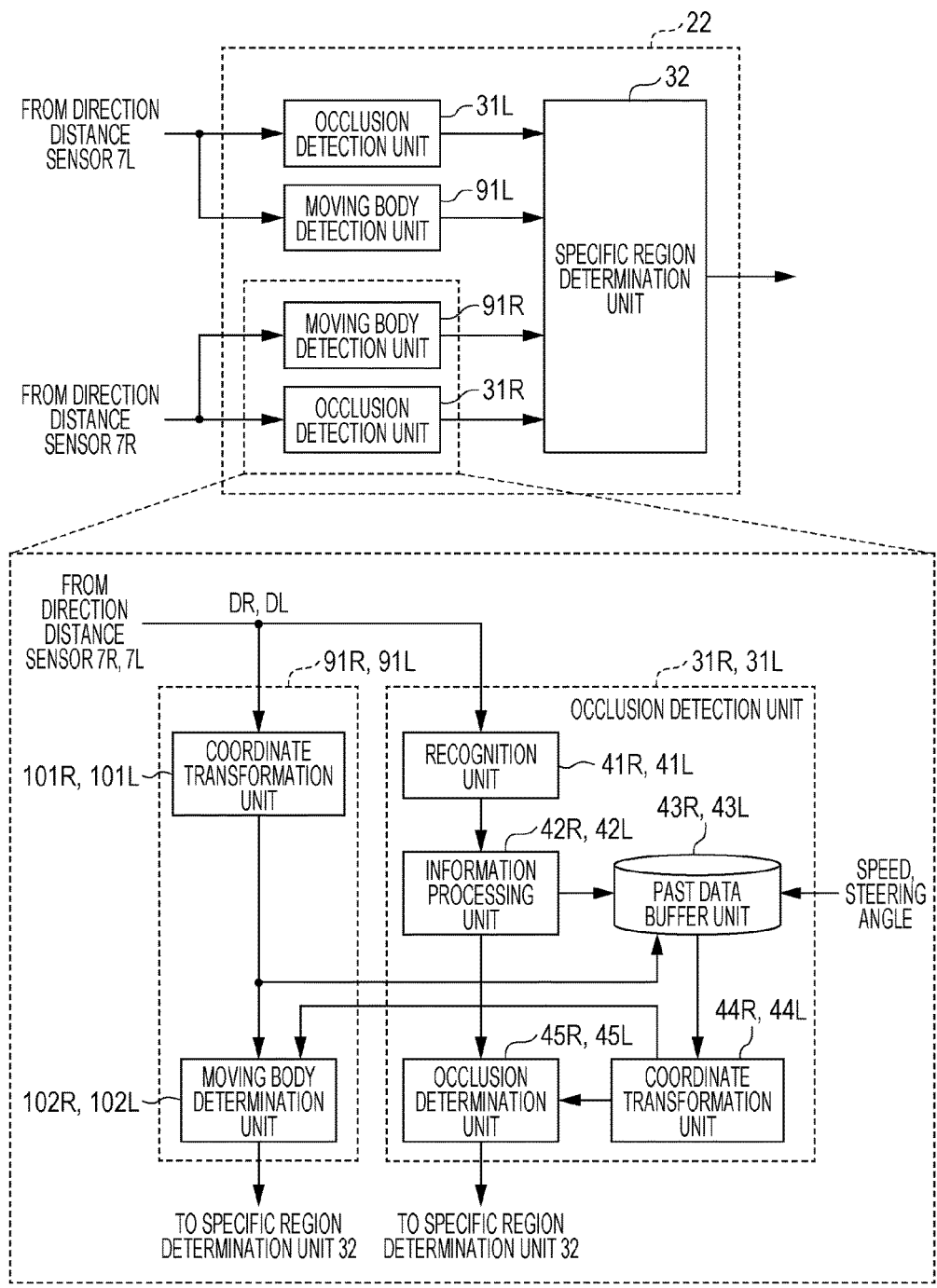
FIG. 14 illustrates an example of functional blocks of a control unit of FIG. 13 and examples of a moving body detection unit and an occlusion detection unit.

The control unit 22 executes a program stored in the non-volatile memory 23 by using the SRAM 24 so as to function as a moving body detection unit 91R and a moving body detection unit 91L as well as the occlusion detection unit 31R, the occlusion detection unit 31L, and the specific region determination unit 32 as illustrated in FIG. 14. Here, processing of the occlusion detection units 31R and 31L and the specific region determination unit 32 includes slight additions when compared with that of the above-described embodiment, so that the additions of the processing will be described below as appropriate.

Further, the moving body detection unit 91R is divided into a coordinate transformation unit 101R and a moving body determination unit 102R as functional blocks.

The coordinate transformation unit 101R transforms a value of the direction distance information DR of a moving body received from the direction distance sensor 7R into a value of a current xy coordinate system in a frame unit. The definition of the current xy coordinate system is same as that in the above-described embodiment. The coordinate transformation unit 101R accumulates coordinate values of the moving body in the past data buffer unit 43R in a frame unit so as to output the coordinate values to the moving body determination unit 102R.

Here, the past data buffer unit 43R accumulates data for the latest n frames as is the case with the above-described embodiment. Further, in addition to the processing same as that of the above-described embodiment, the coordinate transformation unit 44R transforms xy coordinate values of the moving body which are accumulated in the past data buffer unit 43R and are xy coordinate values of past frames into values of a current xy coordinate system and outputs the values of the current xy coordinate system to the moving body determination unit 102R.

The moving body determination unit 102R determines whether or not the moving body is moving in a direction substantially orthogonal to a traveling direction of the transport machine T, as respects the moving body, based on the current xy coordinate values and the xy coordinate values of the past n frames. In the case where the moving body determination unit 102R determines that the moving body is moving in the substantially orthogonal direction, the moving body determination unit 102R further receives a position of the first position PA, a position of the third position PC, an inclination of the second route R2, and the first likelihood $S_R$ which are outputted from the occlusion determination unit 45R and determines whether or not to be a moving body existing in the specific region C based on these outputs. Further, the moving body determination unit 102R calculates the third likelihood $S_{MVR}$ based on the determination result so as to output the third likelihood $S_{MVR}$ to the specific region determination unit 32.

Figure 15:
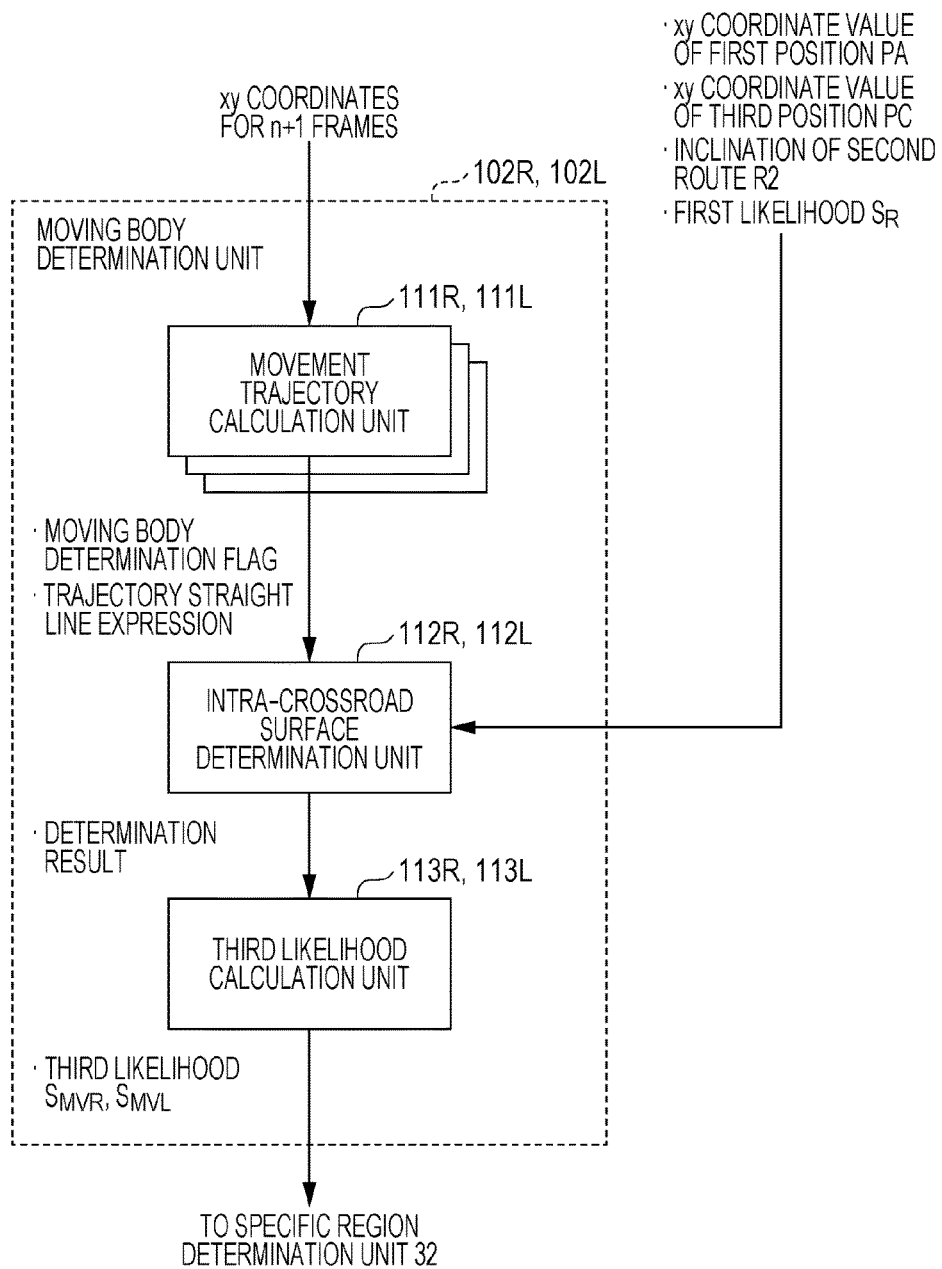
FIG. 15 illustrates an example of a moving body determination unit of FIG. 14.

In order to execute the above-mentioned processing, the moving body determination unit 102R is divided into a movement trajectory calculation unit 111R, an intra-crossroad surface determination unit 112R, and a third likelihood calculation unit 113R as functional blocks as illustrated in FIG. 15.

Figure 16:
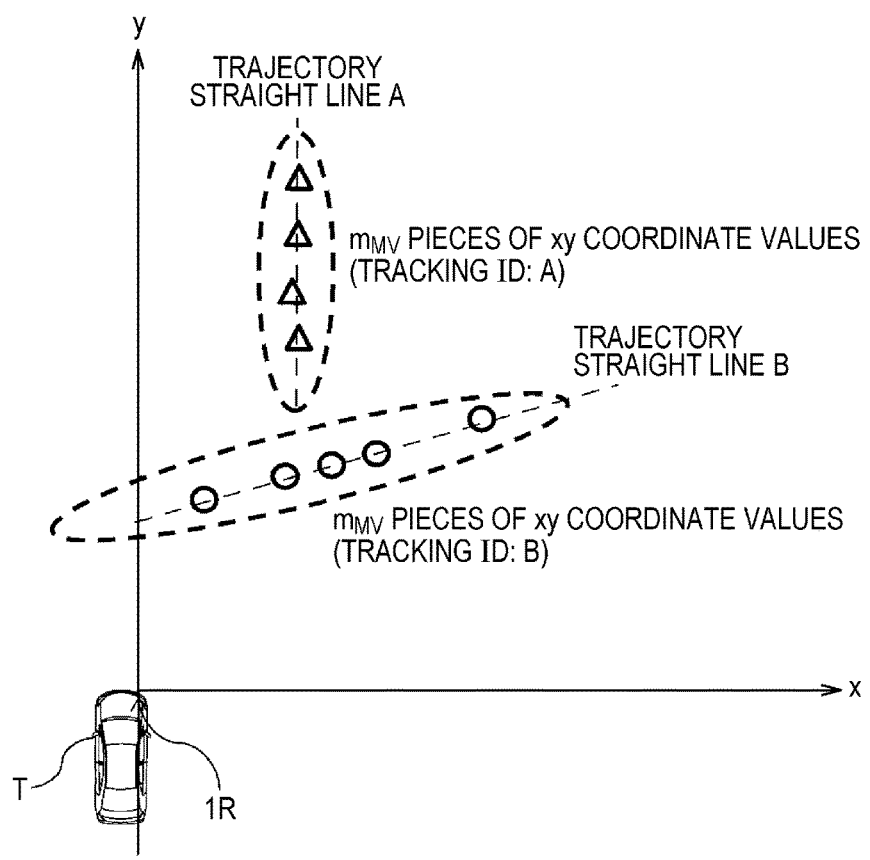
FIG. 16 illustrates an example of processing of a movement trajectory calculation unit of FIG. 15.

The movement trajectory calculation unit 111R receives xy coordinate values for n+1 frames. However, the xy coordinate value of the moving body does not always exist in all xy coordinate values. In the case where the number of xy coordinate values of the moving body is $k_{MV}$ pieces ($k_{MV} \leq n+1$), the movement trajectory calculation unit 111R applies the least squares method or the like to the $k_{MV}$ xy coordinate values so as to obtain an expression of a regression line (referred to below as a trajectory straight line expression) and approximate a movement trajectory of the moving body, as illustrated in FIG. 16, by a straight line. Further, the movement trajectory calculation unit 111R calculates a correlation coefficient with respect to a regression line of the $k_{MV}$ xy coordinate values as well. Here, the movement trajectory calculation unit 111R performs the above-mentioned calculation in a tracking ID unit of the moving body.

The movement trajectory calculation unit 111R selects a tracking ID of an expression of a trajectory straight line an inclination of which is within $I_{MV\_th}$ and is closest to the traveling direction of the transport machine T from the obtained trajectory straight line expressions. Here, $I_{MV\_th}$ denotes a threshold value by which an inclination can be considered to be close to the traveling direction of the transport machine T and is a parameter which can be arbitrarily changed by setting. After succeeding in the selection of the tracking ID, the movement trajectory calculation unit 111R outputs the tracking ID to the intra-crossroad surface determination unit 112R with a moving body determination flag set as 1 and also outputs the trajectory straight line expression to the intra-crossroad surface determination unit 112R.

The intra-crossroad surface determination unit 112R sets a determination result as 1 in the case where all of the following expressions (9) to (12) are satisfied, while the intra-crossroad surface determination unit 112R sets a determination result as 0 in other cases. The intra-crossroad surface determination unit 112R outputs the determination result to the third likelihood calculation unit 113R.

$$F_{MV}=1 \tag{9}$$

$$S_R > S_{th} \tag{10}$$

$$|L_{MV}-L| < L_{th3} \tag{11}$$

$$Y_C \leq L_{MV}*(X_A+X_C)/2+M_{MV} \leq Y_A \tag{12}$$

Here, $(x_A, y_A)$ denotes an xy coordinate value of the first position PA, $(x_C, y_C)$ denotes an xy coordinate value of the third position PC, L denotes an inclination of the second route R2, and $S_R$ denotes the first likelihood.

Further, $F_{MV}$ denotes a value of the moving body determination flag and the trajectory straight line expression is expressed as $y=L_{MV}x+M_{MV}$. Here, $S_{th}$ denotes a threshold value for determining whether or not the first likelihood $S_R$ is high, $L_{th3}$ denotes a threshold value for determining whether or not the moving body is moving in the same direction as that of the second route R2, and each of $S_{th}$ and $L_{th3}$ is a parameter which can be arbitrarily changed by setting.

The third likelihood calculation unit 113R calculates the third likelihood $S_{MVR}$ representing whether or not a moving body is present on the second route R2, based on a determination result of the intra-crossroad surface determination unit 112R. Table 7 shows an example of a method for calculating a likelihood. In the third likelihood calculation unit 113R, points are preliminarily set with respect to various determination items (that is, the intra-crossroad surface determination unit 112R). A point value can be arbitrarily changed. The intra-crossroad surface determination unit 112R sets 1 with respect to a positive determination result and sets 0 with respect to a negative determination result. The first likelihood calculation unit 56R outputs the third likelihood $S_{MVR}$ obtained by multiplying a determination result by a point value for each of the determination items.

TABLE 7

Example of method for calculating third likelihood

| Determination item | Point | Example of determination result (1/0) | Likelihood |
|---|---|---|---|
| Determination in crossroad surface | 10 | 1 | 10 |
| Sum (third likelihood) | — | — | 10 |

Here, in the same viewpoint as the above-described embodiment, the moving body detection unit 91L calculates the third likelihood $S_{MVL}$ on the left side by using the method same as that of the moving body detection unit 91R, and outputs the third likelihood $S_{MVL}$ on the left side to the specific region determination unit 32. Here, the detailed configurations of the moving body detection unit 91L are illustrated with reference characters with suffix L in FIGS. 14 and 15.

The specific region determination unit 32 takes into account the third likelihoods $S_{MVR}$ and $S_{MVL}$ of the moving body determination units 102R and 102L in addition to the processing described in the embodiment above, in calculation of the second likelihood $S_{out}$. Table 8 shows an example of a method for calculating the second likelihood $S_{out}$.

TABLE 8

Example of second likelihood calculation method according to modification

| Shape of intersection | Second likelihood $S_{out}$ |
|---|---|
| 0: No intersection | No output |
| 1: Crossroads intersection | $S_{out} = S_L + S_R + S_M + S_{MVL} + S_{MVR}$ |
| 2: Left T-junction | $S_{out} = S_L + S_{MVL}$ |
| 3: Right T-junction | $S_{out} = S_R + S_{MVR}$ |
| 4: Lower T-junction | $S_{out} = S_L + S_R + S_M + S_{MVL} + S_{MVR}$ |
| 5: Left L-junction | $S_{out} = S_L + S_{MVL}$ |
| 6: Right L-junction | $S_{out} = S_R + S_{MVR}$ |
| 7: Others (unclear) | No output |

<<2-3. Operation and Effect of Modification>>

As described above, according to the determination device 8 of the present modification, a moving body which can be detected by the direction distance sensors 7R and 7L are also taken into account, being able to further enhance accuracy of a likelihood of the specific region C.

3. Additional Statement

In the above-described embodiment and modification, the determination device 2 receives direction distance information from the direction distance sensor 1R as information representing a peripheral state of the transport machine T. However, not limited to this, the determination device 2 may acquire information of a color and luminance for every pixel from a camera as information representing a peripheral state of the transport machine T. In this case, the control unit 22 performs feature point detection and the like with respect to information received from the camera so as to detect feature points and thus obtain position information representing a boundary between the first route R1 and the second route R2, in the determination device 2.

Further, the above-mentioned program may be not only stored in the non-volatile memory 23 to be provided but also provided by a recording medium such as a digital versatile disc (DVD) or via a communication network.

The followings are included as various aspects of embodiments according to the present disclosure.

A determination device according to a first disclosure includes: an input terminal which receives one or more first direction distance information representing a direction and a distance to one or more objects existing in a first range, from a first sensor mounted on a moving body; route detection circuitry which detects, a first continuous body as a first part of the one or more first direction distance information with respect to a first object among the one or more objects, and a second continuous body as a second part of the one or more first direction distance information with respect to a second object which is located farther from the moving body than the first object, among the one or more objects, in a first direction along a first route on which the moving body moves, and a third continuous body as the second part of the one or more first direction distance information, in a second direction different from the first direction; route determination circuitry which determines presence or absence of a second route along the third continuous body in a case where a length of the third continuous body is equal to or more than a first value; and an output terminal which outputs the determination result to a moving body control device, the determination result causing the moving body control device to control the movement of the moving body.

A determination device according to a second disclosure is the determination device of the above-mentioned first disclosure in which the first part and the second part of the one or more first direction distance information are information which are inputted into the input terminal for each determined frame cycle.

A determination device according to a third disclosure is the determination device of the above-mentioned first disclosure in which the route detection circuitry calculates a first likelihood of the first range, the first likelihood representing whether or not the first route and the second route connect with each other, based on the detection result of the second route along the third continuous body, and the route determination circuitry determines shapes of routes including the first route and the second route, by using the first likelihood of the first range.

A determination device according to a fourth disclosure is the determination device of the above-mentioned third disclosure in which the route determination circuitry obtains a first position which is an intersection point between the second continuous body and the third continuous body for each determined frame cycle, determines whether or not each first position which is acquired exists on an identical position, obtains a second position which is an end point of the first continuous body for each determined frame cycle, and determines whether or not an existing position of each second position which is acquired changes in the second direction.

A determination device according to a fifth disclosure is the determination device of the above-mentioned fourth disclosure in which the route determination circuitry obtains a distance between the first position and the second position for each determined frame cycle, and determines a change of the existing position of the second position by using the distance which is obtained.

A determination device according to a sixth disclosure is the determination device of the above-mentioned first disclosure in which the input terminal receives one or more second direction distance information representing a direction and a distance to the one or more objects existing in a second range, the second range being different from the first range, from a second sensor mounted on the moving body, the route detection circuitry detects a fourth continuous body as a third part of the one or more second direction distance information with respect to a third object among the one or more objects, and a fifth continuous body as a fourth part of the one or more second direction distance information with respect to a fourth object which is located farther from the moving body than the third object, among the one or more objects, in the first direction, and a sixth continuous body as the fourth part of the one or more second direction distance information, in a third direction different from the first direction, and the route determination circuitry determines presence or absence of a third route along the sixth continuous body in a case where a length of the sixth continuous body is equal to or more than a second value.

A determination device according to a seventh disclosure is the determination device of the above-mentioned sixth disclosure in which the route detection circuitry calculates a first likelihood of the second range, the first likelihood representing whether or not the third route connects to the first route, based on the detection result of the third route along the fourth continuous body, and the route determination circuitry determines shapes of routes including the first route and the third route, by using the first likelihood of the second range.

A determination device according to an eighth disclosure is the determination device of the above-mentioned seventh disclosure in which the route determination circuitry calculates a second likelihood representing whether or not the first route, the second route, and the third route connect with each other, based on the first likelihood of the first range and the first likelihood of the second range.

A determination device according to a ninth disclosure is the determination device of the above-mentioned third disclosure and includes first moving object detection circuitry which calculates a third likelihood of the first range, the third likelihood representing whether or not another moving body exists in the second route, based on the first direction distance information; wherein the route determination circuitry determines presence or absence of the third route by using the third likelihood of the first range.

A determination device according to a tenth disclosure is the determination device of the above-mentioned seventh disclosure and includes second moving object detection circuitry which calculates a third likelihood of the second range, the third likelihood representing whether or not another moving body exists in the third route, based on the second direction distance information; wherein the route determination circuitry determines presence or absence of the third route by using the third likelihood of the second range.

A determination method according to an eleventh disclosure includes: receiving one or more first direction distance information representing a direction and a distance to one or more objects existing in a first range, from a first sensor mounted on a moving body; detecting a first continuous body as a first part of the one or more first direction distance information with respect to a first object among the one or more objects, and a second continuous body as a second part of the one or more first direction distance information with respect to a second object which is located farther from the moving body than the first object, among the one or more objects, in a first direction along a first route on which the moving body moves, and a third continuous body as the second part of the one or more first direction distance information, in a second direction different from the first direction; determining presence or absence of a second route along the third continuous body in a case where a length of the third continuous body is equal to or more than a first value; and outputting the determination result to a moving body control device, the determination result causing the moving body control device to control the movement of the moving body.

A program, according to a twelfth disclosure, which makes a computer execute processing including: receiving one or more first direction distance information representing a distance to one or more objects existing in a first range, from a first sensor mounted on a moving body; recognizing a first continuous body as a first part of the one or more first direction distance information with respect to a first object among the one or more objects, and a second continuous body as a second part of the one or more first direction distance information with respect to a second object which is located farther from the moving body than the first object, among the one or more objects, in a first direction along a first route on which the moving body moves, and a third continuous body as the second part of the one or more first direction distance information, in a second direction different from the first direction; determining presence or absence of a second route along the third continuous body in a case where a length of the third continuous body is equal to or more than a first value; and outputting the determination result to a moving body control device, the determination result causing the moving body control device to control the movement of the moving body.

A recording medium, according to a thirteenth disclosure, recording a program which makes a computer execute processing including: receiving one or more first distance information representing a distance to one or more objects existing in a first range, from a first sensor mounted on a moving body; recognizing a first continuous body as one or more first distance information with respect to a first object among the one or more objects, and a second continuous body as one or more second distance information with respect to a second object which is more distant from the moving body than the first object, among the one or more objects, in a first direction along a first route on which the moving body travels, and a third continuous body as one or more second direction distance information, in a second direction different from the first direction; determining presence or absence of a second route along the third continuous body in a case where a length of the third continuous body is equal to or more than a predetermined value; and outputting a determination result to a moving body control device mounted on the moving body.

Various embodiments are described above with reference to the accompanying drawings. However, needless to say, the present disclosure is not limited to such examples. It is obvious that a person skilled in the art can conceive various alteration examples or correction examples within the scope of the description of claims, and it shall be automatically understood that these alteration examples or correction examples also belong to the technical scope of the present disclosure. Further, various components in the above-described embodiment may be arbitrarily combined without departing from the spirit of the disclosure.

In the above-described embodiment, such description is provided that the present disclosure is realized by the configuration with hardware. However, the present disclosure may be realized by software in cooperation with hardware.

Further, various functional blocks used in the description of the above embodiment are typically realized as an LSI which is an integrated circuit including an input terminal and an output terminal. These functional blocks may be individually formed into one chip or part or the whole of the functional blocks may be formed into one chip. Though referring to the LSI here, the circuit is sometimes referred to as an IC, a system LSI, a super LSI, or an ultra LSI depending on difference of the degree of integration.

Further, a method of circuit integration is not limited to LSI, but an integrated circuit may be realized by using a dedicated circuit or a general-purpose processor. A field programmable gate array (FPGA) which is programmable and a reconfigurable processor in which connection or setting of circuit cells inside an LSI can be reconfigured may be used after manufacturing of an LSI.

Further, if a technique of circuit integration which can be replaced with the LSI appears through advancement of semiconductor technology or another derived technique, the functional blocks may be integrated obviously by using the technology. There is a possibility of application to the biotechnology and the like.

A determination device, a determination method, and a recording medium recording a program according to the present disclosure are capable of generating information relating to a specific region to which a moving body may run out ahead a transport machine from a lateral side, and are applicable to a peripheral monitoring device of the transport machine or an automatic operation system, for example.

What is claimed is:
1. A determination device, comprising:
an input terminal which receives first direction distance information representing directions and distances to objects existing in a first range, from a first sensor mounted on a moving body;
route detection circuitry which detects, from the first direction distance information,
a first continuous body with respect to a first object among the objects, and a second continuous body with respect to a second object among the objects, the second object being located farther from the moving body than the first object in a first direction along a first route on which the moving body moves, a break zone being between the first continuous body and the second continuous body in the first direction, and
a third continuous body in a second direction different from the first direction;
route determination circuitry which determines presence of a second route along the third continuous body when a length of the third continuous body is at least equal to a first value; and
an output terminal which outputs a determination result of the route determination circuitry to a moving body control device, the determination result causing the moving body control device to control movement of the moving body,
wherein the route detection circuitry calculates a first likelihood for the first range, the first likelihood representing whether or not the first route connects with the second route, based on the determination result of the route determination circuitry, and
the route determination circuitry
determines intersections of routes, T-junctions, or L-junctions of routes including the first route and the second route, by using the first likelihood of the first range, obtains a first position which is an intersection point between the second continuous body and the third continuous body for each frame cycle, determines whether or not the first position which is obtained for each frame cycle exists on an identical position, obtains a second position which is an end point of the first continuous body for each frame cycle, and determines whether or not the second position which is obtained for each frame cycle changes in the second direction.

2. The determination device according to claim 1, wherein the first direction distance information is received by the input terminal with a predetermined frame cycle.

3. The determination device according to claim 1, wherein the route determination circuitry obtains a distance between the first position and the second position for each frame cycle, and determines a change of the second position by using the distance which is obtained for each frame cycle.

4. The determination device according to claim 1, wherein the input terminal receives second direction distance information representing directions and distances to objects existing in a second range, from a second sensor mounted on the moving body, the second range being different from the first range, the route detection circuitry detects, from the second direction distance information, a fourth continuous body with respect to a third object among the objects existing in the second range, and a fifth continuous body with respect to a fourth object among the objects existing in the second range, the second object being located farther from the moving body than the third object in the first direction, and a sixth continuous body in a third direction different from the first direction, and the route determination circuitry determines presence of a third route along the sixth continuous body when a length of the sixth continuous body is at least equal to a second value.

5. The determination device according to claim 4, wherein the route detection circuitry calculates a second likelihood for the second range, the second likelihood representing whether or not the third route connects to the first route, based on a second determination result of the route determination circuitry with respect to the presence of the third route along the sixth continuous body, and the route determination circuitry determines intersections of routes, T-junctions or L-junctions of routes including the first route and the third route, by using the second likelihood of the second range.

6. The determination device according to claim 5, wherein the route determination circuitry calculates a third likelihood representing whether or not the first route connects with each of the second route and the third route, based on the first likelihood of the first range and the second likelihood of the second range.

7. The determination device according to claim 5, further comprising:

moving object detection circuitry which calculates a fourth likelihood for the second range, the fourth likelihood representing whether or not another moving body exists on the third route, based on the second direction distance information, wherein the route determination circuitry further determines the presence of the third route by using the fourth likelihood of the second range.

8. The determination device according to claim 4, further comprising:

moving object detection circuitry which calculates a second likelihood for the first range, the second likelihood representing whether or not another moving body exists on the second route, based on the first direction distance information, wherein the route determination circuitry further determines the presence of the third route by using the second likelihood of the first range.

9. A determination method, comprising:

receiving first direction distance information representing directions and distances to objects existing in a first range, from a first sensor mounted on a moving body;

detecting, from the first direction distance information, a first continuous body with respect to a first object among the objects, and a second continuous body with respect to a second object among the objects, the second object being located farther from the moving body than the first object in a first direction along a first route on which the moving body moves, a break zone being between the first continuous body and the second continuous body in the first direction, and a third continuous body in a second direction different from the first direction;

determining presence of a second route along the third continuous body when a length of the third continuous body is at least equal to a first value;

calculating a first likelihood for the first range, the first likelihood representing whether or not the first route connects with the second route, based on a first determination result of the determining the presence of the second route;

obtaining a first position which is an intersection point between the second continuous body and the third continuous body for each frame cycle;

determining whether or not the first position which is obtained for each frame cycle exists on an identical position;

obtaining a second position which is an end point of the first continuous body for each frame cycle;

determining whether or not the second position which is obtained for each frame cycle changes in the second direction;

determining intersections of routes, T-junctions, or L-junctions of routes including the first route and the second route, by using the first likelihood of the first range; and outputting a second determination result of the determining of the intersections to a moving body control device, the second determination result causing the moving body control device to control movement of the moving body.

10. A non-transitory recording medium recording a program which makes a computer execute processing comprising:

receiving first direction distance information representing directions and distances to objects existing in a first range, from a first sensor mounted on a moving body;

recognizing, from the first direction distance information, a first continuous body with respect to a first object among the objects, and a second continuous body with respect to a second object among the objects, the second object being located farther from the moving body than the first object in a first direction along a first route on which the moving body moves, a break zone being between the first continuous body and the second continuous body in the first direction, and a third continuous body in a second direction different from the first direction;

determining presence of a second route along the third continuous body when a length of the third continuous body is at least equal to a first value;

calculating a first likelihood for the first range, the first likelihood representing whether or not the first route connects with the second route, based on a first determination result of the determining the presence of the second route;

obtaining a first position which is an intersection point between the second continuous body and the third continuous body for each frame cycle;

determining whether or not the first position which is obtained for each frame cycle exists on an identical position;

obtaining a second position which is an end point of the first continuous body for each frame cycle;

determining whether or not the second position which is obtained for each frame cycle changes in the second direction;

determining intersections of routes, T-junctions, or L-junctions of routes including the first route and the second route, by using the first likelihood of the first range; and outputting a second determination result of the determining of the intersections to a moving body control device, the second determination result causing the moving body control device to control movement of the moving body.

* * * * *